(12) United States Patent
Zamir et al.

(10) Patent No.: US 11,379,305 B2
(45) Date of Patent: Jul. 5, 2022

(54) FAST VERIFICATION OF NON-VOLATILE DATA INTEGRITY

(71) Applicant: Western Digital Technologies, Inc., San Jose, CA (US)

(72) Inventors: Ran Zamir, Ramat Gan (IL); David Avraham, Even-Yehuda (IL); Eran Sharon, Rishon Lezion (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/171,657

(22) Filed: Feb. 9, 2021

(65) Prior Publication Data

US 2022/0156143 A1 May 19, 2022

Related U.S. Application Data

(60) Provisional application No. 63/114,103, filed on Nov. 16, 2020.

(51) Int. Cl.
*G06F 11/10* (2006.01)
*G06F 13/16* (2006.01)

(52) U.S. Cl.
CPC ...... *G06F 11/1068* (2013.01); *G06F 13/1668* (2013.01)

(58) Field of Classification Search
CPC ............ G06F 11/1068; G06F 11/1072; G06F 11/1012; G06F 3/0619; G06F 3/0679; G06F 11/0751; H03M 13/1111; H03M 13/1102; H03M 13/612; H03M 13/1108
USPC .......................... 714/704, 707, 709, 710, 712
See application file for complete search history.

(56) References Cited

U.S. PATENT DOCUMENTS

| | | |
|---|---|---|
| RE41,913 E | 11/2010 | King |
| 8,307,271 B1 | 11/2012 | Liu et al. |
| 8,726,104 B2 | 5/2014 | Sharon |
| 8,910,031 B1 | 12/2014 | Liu et al. |
| 8,939,056 B1 * | 1/2015 | Neal, III ............... B64D 17/80 89/1.51 |
| 8,984,190 B2 * | 3/2015 | Lin ....................... G06F 3/067 710/74 |

(Continued)

OTHER PUBLICATIONS

NVM Express, "Base Specification," Revision 1.4, Jun. 10, 2019, 403 pages.

(Continued)

*Primary Examiner* — Shelly A Chase
(74) *Attorney, Agent, or Firm* — Vierra Magen Marcus LLP

(57) ABSTRACT

Fast verification of data integrity of non-volatile memory cells is disclosed. In one aspect, an estimate is made of a bit error rate (BER) associated with the data to be verified without fully decoding the data. If the estimated BER is below a threshold, then the storage system reports that the data meets a data integrity criterion. If the estimated BER is above the threshold, the storage system may decode the data to determine a BER and report whether the data meets the data integrity criterion based on the determined BER. The estimate of the BER may be based on a syndrome weight of the data, a BER of an XOR codeword formed from multiple codewords of the data, or a BER of a sample of the data. Hence, considerable time and power are saved verifying data integrity, at least when the data is not fully decoded.

19 Claims, 22 Drawing Sheets

(56) References Cited

U.S. PATENT DOCUMENTS

| | | | |
|---|---|---|---|
| 9,317,358 B2 | 4/2016 | Foster et al. | |
| 9,697,905 B2 | 7/2017 | Sharon et al. | |
| 9,817,752 B2 | 11/2017 | Desai et al. | |
| 10,089,177 B2 | 10/2018 | Bazarsky et al. | |
| 10,475,523 B2 | 11/2019 | Sharon et al. | |
| 10,534,738 B2* | 1/2020 | Ranjan | G06F 13/4068 |
| 2008/0091931 A1* | 4/2008 | McNutt | G05B 19/054 |
| | | | 713/1 |
| 2013/0031431 A1* | 1/2013 | Sharon | G11C 16/3481 |
| | | | 714/719 |
| 2015/0188570 A1* | 7/2015 | Kwok | G06F 11/1076 |
| | | | 714/764 |
| 2015/0358036 A1* | 12/2015 | Tseng | G06F 11/1012 |
| | | | 714/755 |
| 2017/0123898 A1* | 5/2017 | Ryabinin | H03M 13/1111 |
| 2019/0245651 A1* | 8/2019 | Yuan | H04L 1/1829 |
| 2021/0168641 A1* | 6/2021 | Frenne | H04W 24/08 |

OTHER PUBLICATIONS

Seagate, "SCSI Commands Reference Manual," Rev. J, Oct. 2016, 518 pages.

\* cited by examiner

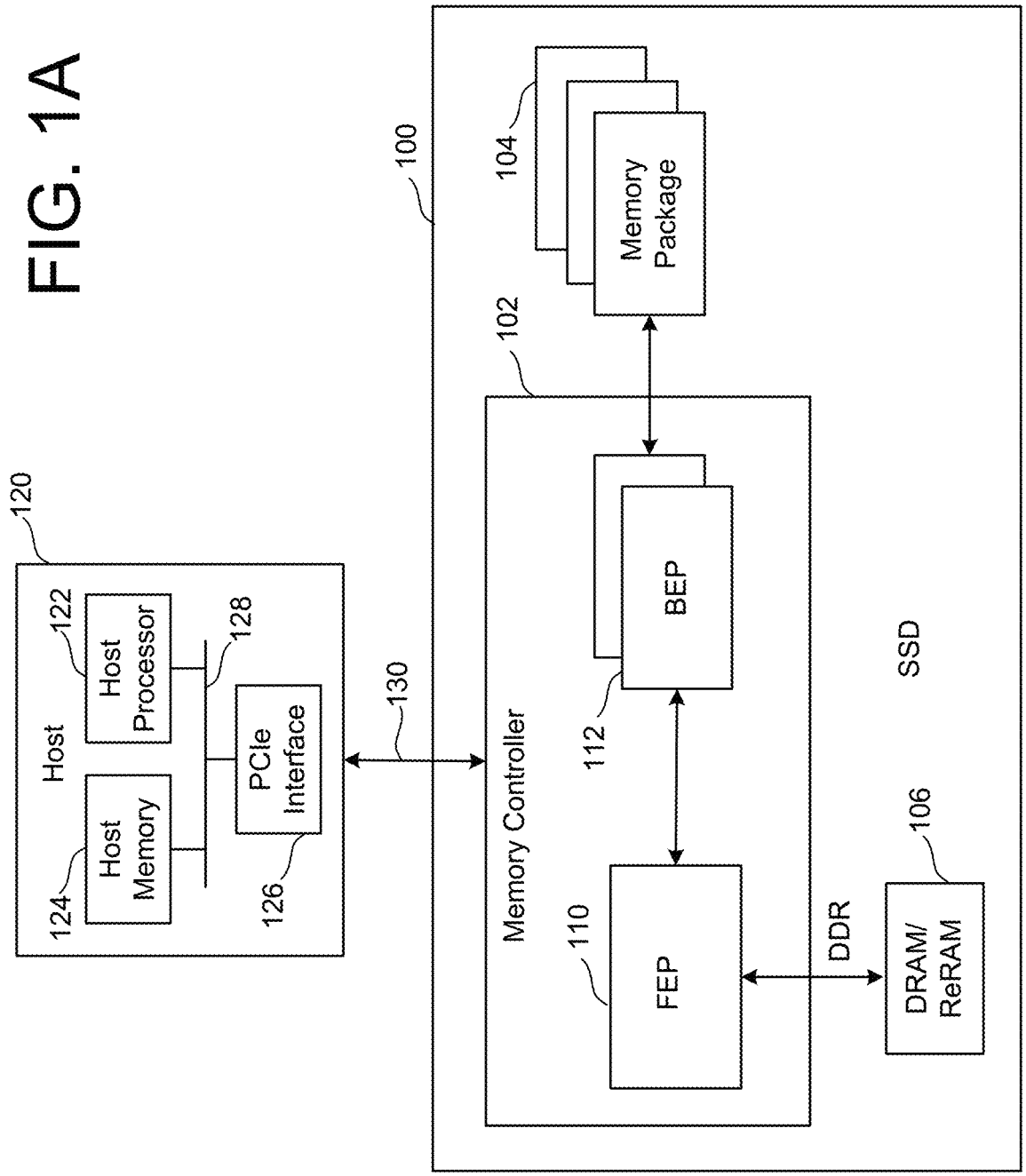

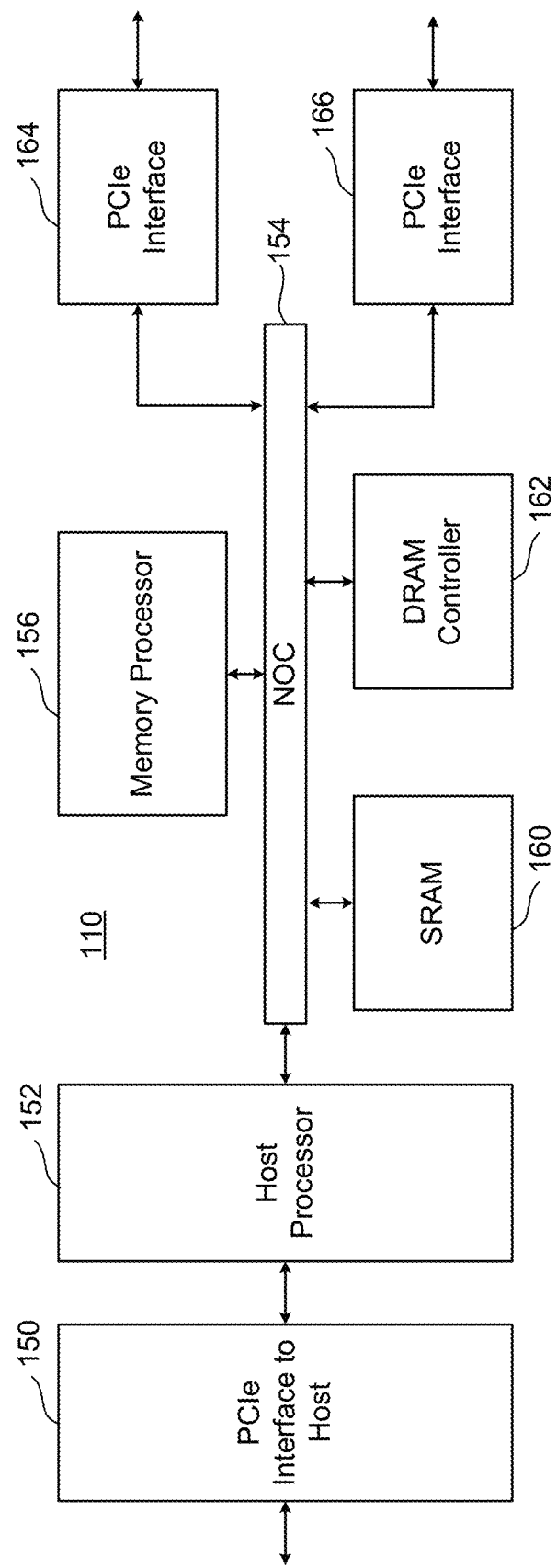

Sparse parity check matrix H

N=13 variable nodes

| | v1 | v2 | v3 | v4 | v5 | v6 | v7 | v8 | v9 | v10 | v11 | v12 | v13 |
|---|---|---|---|---|---|---|---|---|---|---|---|---|---|
| cn1 | | 1 | | 1 | | | | | | | 1 | | 1 |
| cn2 | 1 | | | | | | 1 | | | | | 1 | |
| cn3 | | | 1 | | 1 | 1 | | | 1 | 1 | | | |
| cn4 | | 1 | | | | | | 1 | | 1 | | | |
| cn5 | | | | 1 | | 1 | | | | | | 1 | |
| cn6 | 1 | | | 1 | 1 | | | 1 | | | | | |
| cn7 | | 1 | | | | | | 1 | 1 | | | | 1 |
| cn8 | | | | 1 | | 1 | | | | | 1 | 1 | |
| cn9 | 1 | | 1 | 1 | | | | | | | | | 1 |
| cn10 | | | | | | | 1 | 1 | 1 | 1 | | | |

M=10 check nodes

Sparse bipartite graph, 392

FAST VERIFICATION OF NON-VOLATILE DATA INTEGRITY

CLAIM OF PRIORITY

The present application claims priority from U.S. Provisional Patent Application No. 63/114,103, entitled "FAST VERIFICATION OF NON-VOLATILE DATA INTEGRITY," by Zamir et al., filed Nov. 16, 2020, incorporated by reference herein in its entirety.

BACKGROUND

The strong growth in demand for portable consumer electronic devices is driving the need for high-capacity storage devices. Non-volatile semiconductor memory devices (also referred to herein as "non-volatile storage systems" or "non-volatile memory systems"), such as flash memory, are widely used to meet the ever-growing demands on digital information storage and exchange. Their portability, versatility and rugged design, along with their high reliability and large capacity, have made such memory devices ideal for use in a wide variety of host electronic devices, including for example digital cameras, digital music players, video game consoles, PDAs, cellular telephones, and desktop, laptop, and notepad computers. Typically, the host electronic devices provides power to the non-volatile storage system.

Non-volatile semiconductor memory devices contain non-volatile memory cells that may be programmed to store data. Typically, the memory cells are programmed to a number of data states. Using a greater number of data states allows for more bits to be stored per memory cell. For example, four data states may be used to store two bits per memory cell, eight data states may be used in order to store three bits per memory cell, 16 data states may be used to store four bits per memory cell, etc. To read the data back from the memory cells it is typical to use read reference voltages in order to determine what data state a memory cell is presently in.

Some memory cells have a charge storage region that is programmed to hold an amount of charge that reflects the programmed state of the memory cell. For example, charge may be added to a charge storage region of a NAND memory cell to program the threshold voltage of a memory cell transistor to a target threshold voltage. Some memory cells are programmed based on other physical parameters such as resistance.

Once a memory cell has been programmed, it is important that its state can be read back with a high degree of reliability. However, the sensed state can sometimes vary from the intended programmed state due to factors including program disturb, read disturb and data retention problems. Program disturb is an effect in which programming a neighboring memory cell disturbs the state of the target memory cell. For example, programming a neighbor NAND memory cell could add charge to the target NAND memory cell, thereby increasing the threshold voltage of the target NAND memory cell. Read disturb is an effect in which reading the target memory cell disturbs the state of the target memory cell. Data retention problems refer to the failure to hold data over long periods of time. Data retention problems can result in a change of state that occurs over time due to factors such as charge loss. For example, over time a NAND memory cell could lose charge, thereby decreasing the threshold voltage of the NAND memory cell.

An unintended change of data state is a failure of data integrity. In order to maintain data integrity, an error correction code (ECC) may be used, in addition to multiple tiers of recovery. An ECC encoder may generate parity bits based on the user data. The parity bits may be stored in the memory cells. For example, an ECC codeword (or more briefly "codeword") that contains the user data and the parity bits may be stored in the memory cells. An ECC decoder may be used to run an ECC algorithm to detect and correct errors in the data. However, in some cases there may be too many errors for the ECC decoder to correct the user data in an ECC codeword. Some techniques use several ECC decoders, which differ in their error correction capability. If a lower-power, lower-correction-capability ECC decoder fails, then a higher-power, higher-correction-capability ECC decoder may be used. If the ECC decoders fail, then another option is to calibrate the read reference voltages and make another decoding attempt.

If the data still cannot be decoded after calibrating the read reference voltages, soft bits may be used to decode the data. Soft bits are derived from sensing the memory cells at a set of "soft bit reference levels." Soft bits can indicate reliability of a hard bit for each memory cell. To illustrate, soft bits may be used with ECC decoding to enhance error correction capability. For example, improved error correction capability may be achieved by using low-density parity-check (LDPC) codes, and including soft bit values, as inputs to a decoder as compared to a decoding scheme that is based on using hard bits only.

If the data still cannot be decoded after using soft bits, redundancy information such as a RAID (redundant array of independent disks) technique may be used to recover the un-decodable data.

However, the foregoing protections can use considerable time and power.

Techniques have been proposed to verify integrity of data stored in non-volatile memory. For example, an NVMe Verify command is described in section 6.14 of NVM Express™ Base Specification, Revision 1.4, Jun. 10, 2019. As another example, an NVMe Get LBA Status command is described in section 5.27 of NVM Express™ Base Specification, Revision 1.4, Jun. 10, 2019. However, execution of such commands could potentially consume considerable time and power.

DESCRIPTION OF THE DRAWINGS

Like-numbered elements refer to common components in the different Figures.

FIG. 1A is a block diagram of one embodiment of a storage system connected to a host.

FIG. 1B is a block diagram of one embodiment of a Front End Processor Circuit.

DETAILED DESCRIPTION

Figure 2A:
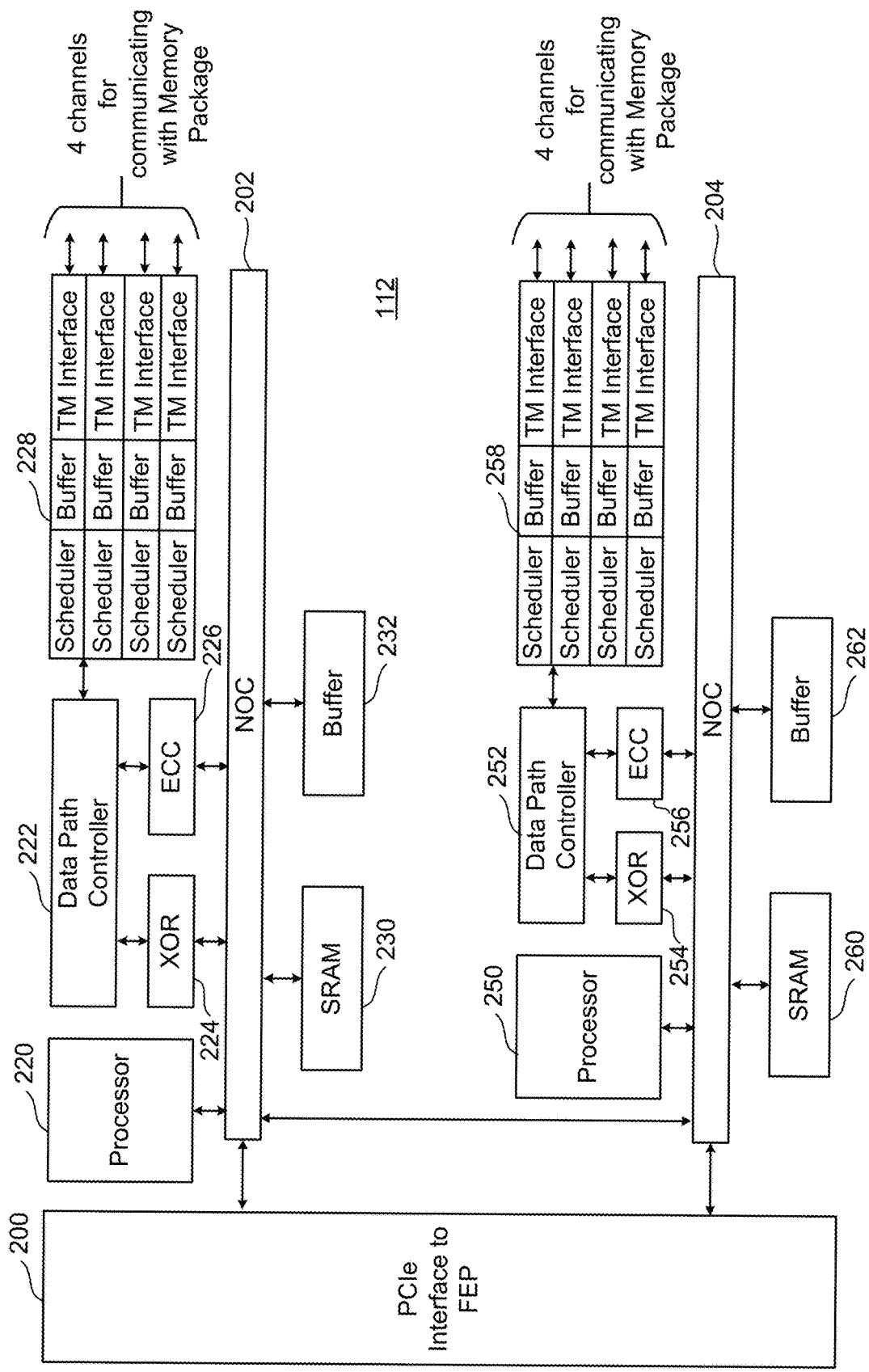
FIG. 2A is a block diagram of one embodiment of a Back End Processor Circuit.

The present technology will now be described with reference to the figures, which in embodiments, relate to fast verification of data integrity of non-volatile memory cells. In one embodiment, a storage system verifies the integrity of data stored in the memory cells in response to a verify command from a host system. The verify command identifies the data in some manner, such as by a logical block address (LBA). The verify command may be similar to a read command, except that the data to be verified is not returned to the requestor. Thus, the storage system may sense the memory cells to determine the data integrity, without sending data to the requestor. In an embodiment, the storage system reports whether the integrity of the data meets a data integrity criterion. For example, the storage system could report whether there are no errors in the data, a CECC (correctable ECC error), an uncorrectable ECC (UECC). A CECC refers to a case in which an error (e.g., bit flip) is detected in stored data, but the error is correctable by using the ECC associated with the data. A UECC occurs when an error in the data is not correctable by using the ECC associated with the data. One possible use-case for the verify command is to perform a low-level scrub of the stored data without the host interface being bottlenecked by transferring the data. The storage system may react to a CECC by moving or re-writing degraded data. Hence, a verify command may trigger the same behavior. Overall, this should reduce the need for filesystem-level checksum scrubbing/verification. An example of a verify command is an NVMe (Non-Volatile Memory Express) Verify command. However, verify commands are possible with other memory specifications.

In some embodiments, a fast verification of data integrity is made by performing only a portion of a normal sense and decode of the data that would normally be performed for a read operation. In one embodiment, an estimate is made of a bit error rate (BER) associated with the data to be verified without fully decoding the data. If the estimated BER is below a threshold, then the storage system reports to the host system that the data meets a data integrity criterion. The data integrity criterion may be based on whether a read command would likely have resulted in a certain type of error being reported. Examples of possible errors include, but are not limited to, a CECC and an uncorrectable ECC (UECC). For example, if the estimated BER indicates that a read command would likely have returned either no error or a CECC, then the data integrity criterion is met if the data criterion is that the data is correctable by ECC. In some embodiments, if the estimated BER is above a threshold, then the storage system fully decodes the data to determine a BER and reports whether the data meets the data integrity criterion based on the determined BER. Hence, considerable time and power is saved verifying data integrity, at least in cases in which the data is not fully decoded.

In one embodiment, the estimate of the BER is made by first determining a syndrome weight (SW) of the data without fully decoding the data. Then, the BER may be estimated based on the SW. In one embodiment, the estimate of the BER is made by performing a bitwise XOR of multiple codewords of data to produce an XOR codeword. Then, a BER of the XOR codeword is determined in order to estimate the BER associated with the data to be verified. In one embodiment, the SW of the XOR codeword is determined in order to estimate the BER of the XOR codeword. The, the BER associated with the data to be verified may be estimated based on the estimated BER of the XOR codeword. In one embodiment, a BER of a sample of the data to be verified is made. For example, the sample may be one codeword per page, one page per word line, or a subset of word lines in a block, etc.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

FIGS. 1A-3C and 4-5B describe one example of a storage system that can be used to implement the technology disclosed herein. FIG. 1A is a block diagram of one embodiment of a storage system 100 connected to a host system 120. Storage system 100 can implement the technology disclosed herein. Many different types of storage systems can be used with the technology disclosed herein. One example storage system is a solid state drive ("SSD"); however, other types of storage systems can also be used. Storage system 100 comprises a memory controller 102, memory package 104 for storing data, and local memory (e.g. DRAM/ReRAM) 106. Memory controller 102 comprises a Front End Processor Circuit (FEP) 110 and one or more Back End Processor Circuits (BEP) 112. In one embodiment FEP 110 circuit is implemented on an ASIC. In one embodiment, each BEP circuit 112 is implemented on a separate ASIC. The ASICs for each of the BEP circuits 112 and the FEP circuit 110 are implemented on the same semiconductor such that the memory controller 102 is manufactured as a System on a Chip ("SoC"). FEP 110 and BEP 112 both include their own processors. In one embodiment, FEP 110 and BEP 112 work as a master slave configuration where the FEP 110 is the master and each BEP 112 is a slave. For example, FEP circuit 110 implements a flash translation layer that performs memory management (e.g., garbage collection, wear leveling, etc.), logical to physical address translation, communication with the host, management of DRAM (local volatile memory) and management of the overall operation of the SSD (or other non-volatile storage system). The BEP circuit 112 manages memory operations in the memory package/die at the request of FEP circuit 110. For example, the BEP circuit 112 can carry out the read, erase and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages. Memory controller 102 is one example of a control circuit.

In one embodiment, there are a plurality of memory packages 104. Each memory package 104 may contain one or more memory dies. In one embodiment, each memory die in the memory package 104 utilizes NAND flash memory (including two dimensional NAND flash memory and/or three dimensional NAND flash memory). In other embodiments, the memory package 104 can include other types of memory; for example, the memory package can include Phase Change Memory (PCM) memory.

In one embodiment, memory controller 102 communicates with host system 120 using an interface 130 that implements NVM Express (NVMe) over PCI Express (PCIe). The interface 130 is not required to implement NVMe over PCIe. For working with storage system 100, host 120 includes a host processor 122, host memory 124, and a PCIe interface 126, which communicate over bus 128. Host memory 124 is the host's physical memory, and can be DRAM, SRAM, non-volatile memory or another type of storage. Host 120 is external to and separate from storage system 100. In one embodiment, storage system 100 is embedded in host 120.

FIG. 1B is a block diagram of one embodiment of FEP circuit 110. FIG. 1B shows a PCIe interface 150 to communicate with host 120 and a host processor 152 in communication with that PCIe interface. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOC's can span synchronous and asynchronous clock domains or use un-clocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the DRAM (e.g., DRAM 106). SRAM 160 is local RAM memory used by memory processor 156. Memory processor 156 is used to run the FEP circuit and perform the various memory operations. Also in communication with the NOC are two PCIe Interfaces 164 and 166. In the embodiment of FIG. 1B, memory controller 102 includes two BEP circuits 112; therefore, there are two PCIe Interfaces 164/166. Each PCIe Interface communicates with one of the BEP circuits 112. In other embodiments, there can be more or less than two BEP circuits 112; therefore, there can be more than two PCIe Interfaces.

FIG. 2A is a block diagram of one embodiment of the BEP circuit 112. FIG. 2A shows a PCIe Interface 200 for communicating with the FEP circuit 110 (e.g., communicating with one of PCIe Interfaces 164 and 166 of FIG. 1). PCIe Interface 200 is in communication with two NOCs 202 and 204. In one embodiment the two NOCs can be combined to one large NOC. Each NOC (202/204) is connected to SRAM (230/260), a buffer (232/262), processor (220/250), and a data path controller (222/252) via an XOR engine (224/254), an ECC engine (226/256).

The ECC engines 226/256 are used to perform error correction, as known in the art. Herein, the ECC engines 226/256 may be referred to as controller ECC engines. The XOR engines 224/254 are used to XOR the data so that data can be combined and stored in a manner that can be recovered in case there is a programming error. In an embodiment, the XOR engines 224/254 are able to recover data that cannot be decoded using ECC engine 226/256. In some embodiments, the ECC engines 226/256 are configured to determine a SW of a codeword. In some embodiments, the processor (220/250) is configured to estimate a BER of data to be verified, as described herein. The processor (220/250) may report whether the integrity of the data meets a data integrity criterion based on the estimated BER.

Data path controller 222 is connected to a memory interface 228 for communicating via four channels with integrated memory assemblies. Thus, the top NOC 202 is associated with memory interface 228 for four channels for communicating with memory packages and the bottom NOC 204 is associated with memory interface 258 for four additional channels for communicating with memory packages. In one embodiment, each memory interface 228/258 includes four Toggle Mode interfaces (TM Interface), four buffers and four schedulers. There is one scheduler, buffer and TM Interface for each of the channels. The processor can be any standard processor known in the art. The data path controllers 222/252 can be a processor, FPGA, microprocessor or other type of controller. The XOR engines 224/254 and ECC engines 226/256 are dedicated hardware circuits, known as hardware accelerators. In other embodiments, the XOR engines 224/254, ECC engines 226/256 can be implemented in software. The scheduler, buffer, and TM Interfaces are hardware circuits. In other embodiments, the memory interface (an electrical circuit for communicating with memory dies) can be a different structure than depicted in FIG. 2A. Additionally, controllers with structures different than FIGS. 1B and 2A can also be used with the technology described herein.

Figure 2B:
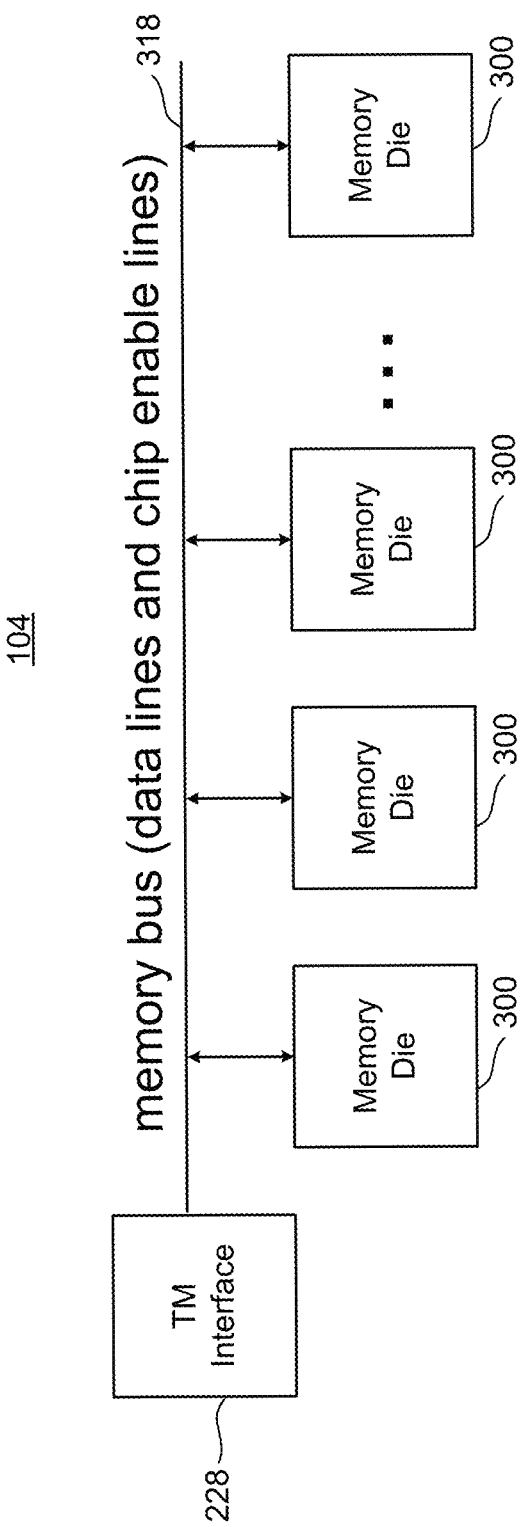
FIG. 2B is a block diagram of one embodiment of a memory package.

FIG. 2B is a block diagram of one embodiment of a memory package 104 that includes a plurality of memory dies 300 connected to a memory bus (data lines and chip enable lines) 322. The memory bus 322 connects to a Toggle Mode Interface 228 for communicating with the TM Interface of a BEP circuit 112 (see e.g., FIG. 2A). In some embodiments, the memory package can include a small controller connected to the memory bus and the TM Interface. In total, the memory package 104 may have eight or 16 memory die; however, other numbers of memory die can also be implemented. The technology described herein is not limited to any particular number of memory die.

Figure 3A:
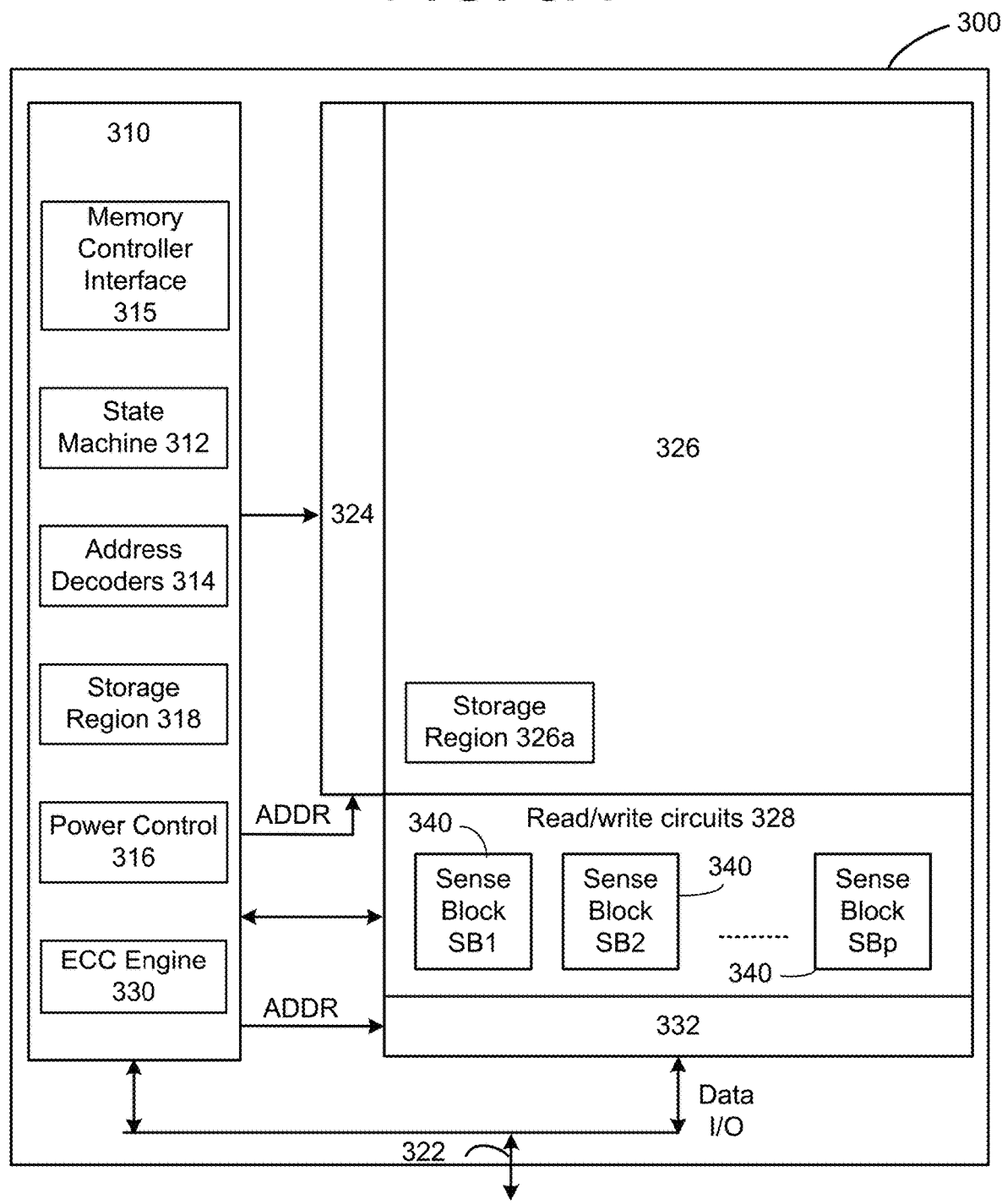
FIG. 3A is a functional block diagram of an embodiment of a memory die.

FIG. 3A is a functional block diagram of one embodiment of a memory die 300. Each of the one or more memory die 300 of FIG. 2B can be implemented as memory die 300 of FIG. 3A. The components depicted in FIG. 3A are electrical circuits. In one embodiment, each memory die 300 includes a memory structure 326, control circuitry 310, read/write circuits 328, and decoders 324/332, all of which are electrical circuits. Memory structure 326 is addressable by word lines via a row decoder 324 and by bit lines via a column decoder 332. The read/write circuits 328 include multiple sense blocks 340 including SB1, SB2, . . . , SBp (sensing circuitry) and allow a page (or multiple pages) of data in multiple memory cells to be read or programmed in parallel. In one embodiment, each sense block include a sense amplifier and a set of latches connected to the bit line. The latches store data to be written and/or data that has been read. The sense blocks include bit line drivers.

Commands and data are transferred between the controller 102 and the memory die 300 via memory controller interface 315 (also referred to as a "communication interface"). Memory controller interface 315 is an electrical interface for communicating with memory controller 102. Examples of memory controller interface 315 include a Toggle Mode Interface and an Open NAND Flash Interface (ONFI). Other I/O interfaces can also be used. For example, memory controller interface 315 may implement a Toggle Mode Interface that connects to the Toggle Mode interfaces of memory interface 228/258 for memory controller 102. In one embodiment, memory controller interface 315 includes a set of input and/or output (I/O) pins that connect to memory bus 322. In one embodiment, memory bus 322 connects to the memory controller 102 as part of the Toggle Mode Interface.

Control circuitry 310 cooperates with the read/write circuits 328 to perform memory operations (e.g., write, read, erase, and others) on memory structure 326. In one embodiment, control circuitry 310 includes a state machine 312, an on-chip address decoder 314, power control 316, a memory controller interface 315, and storage region 318. State machine 312 provides die-level control of memory operations. In one embodiment, state machine 312 is programmable by software. In other embodiments, state machine 312 does not use software and is completely implemented in hardware (e.g., electrical circuits). In some embodiments, state machine 312 can be replaced by a microcontroller or microprocessor. In one embodiment, control circuitry 310 includes buffers such as registers, ROM fuses and other storage devices for storing default values such as base voltages, and other parameters. The default values and other parameters could be stored in a region of the memory structure 326 (e.g., structure parameter storage 326a). These default values may be updated from time to time.

The on-chip address decoder 314 provides an address interface between addresses used by controller 102 to the hardware address used by the decoders 324 and 332. Power control 316 controls the power and voltages supplied to the word lines and bit lines during memory operations. Power control 316 may include charge pumps for creating voltages.

Storage region 318 may be used to store parameters for operating the memory structure 326. Storage region 318 may include volatile or non-volatile memory. In some embodiments, the parameters include read reference voltages. In one embodiment, the storage region 318 contains a look-up-table that correlates SW to BER. The memory structure 326 has storage region 326a, which may also contain a copy of the parameters for operating the memory structure 326. In some embodiments, the parameters are copied from storage region 326a to storage region 318 when the memory die 300 is powered on.

For purposes of this document, control circuitry 310, alone or in combination with read/write circuits 328 and decoders 324/332, comprise a control circuit connected to memory structure 326. The control circuit is an electrical circuit that performs the functions described below in the flow charts. In other embodiments, the control circuit can consist only of controller 102 (or other controller), which is an electrical circuit in combination with software (e.g., firmware), that performs the functions described below in the flow charts. In one embodiment, the control circuit is the controller where the controller is an electrical circuit that does not use hardware. In another alternative, the control circuit comprises controller 102 and control circuitry 310 performing the functions described below in the flow charts. In another embodiment, the control circuit comprises state machine 312 (and/or a microcontroller and/or microprocessor) alone or in combination with controller 102. In another alternative, the control circuit comprises controller 102, control circuitry 310, read/write circuits 328 and decoders 324/332 performing the functions described below in the flow charts. In other embodiments, the control circuit comprises one or more electrical circuits that operate the non-volatile memory.

In one embodiment, memory structure 326 comprises a monolithic three-dimensional memory array of non-volatile memory cells in which multiple memory levels are formed above a single substrate, such as a wafer. The memory structure may comprise any type of non-volatile memory that is monolithically formed in one or more physical levels of arrays of memory cells having an active area disposed above a silicon (or other type of) substrate. In one example, the non-volatile memory cells of memory structure 326 comprise vertical NAND strings with charge-trapping material such as described, for example, in U.S. Pat. No. 9,721,662, incorporated herein by reference in its entirety. In another embodiment, memory structure 326 comprises a two dimensional memory array of non-volatile memory cells. In one example, the non-volatile memory cells are NAND flash memory cells utilizing floating gates such as described, for example, in U.S. Pat. No. 9,082,502, incorporated herein by reference in its entirety. Other types of memory cells (e.g., NOR-type flash memory) can also be used.

The exact type of memory array architecture or memory cell included in memory structure 326 is not limited to the examples above. Many different types of memory array architectures or memory cell technologies can be used to form memory structure 326. No particular non-volatile memory technology is required for purposes of the new claimed embodiments proposed herein. Other examples of suitable technologies for memory cells of the memory structure 326 include ReRAM memories, magnetoresistive memory (e.g., MRAM, Spin Transfer Torque MRAM, Spin Orbit Torque MRAM), phase change memory (e.g., PCM), and the like. Examples of suitable technologies for architectures of memory structure 326 include two dimensional arrays, three dimensional arrays, cross-point arrays, stacked two dimensional arrays, vertical bit line arrays, and the like.

One example of a ReRAM, or PCMRAM, cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A storage device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a $Ge_2Sb_2Te_5$ alloy to achieve phase changes by electrically heating the phase change material. The doses of programming are electrical pulses of different amplitude and/or length resulting in different resistance values of the phase change material.

A person of ordinary skill in the art will recognize that the technology described herein is not limited to a single specific memory structure, but covers many relevant memory structures within the spirit and scope of the technology as described herein and as understood by one of ordinary skill in the art.

Figure 3B:
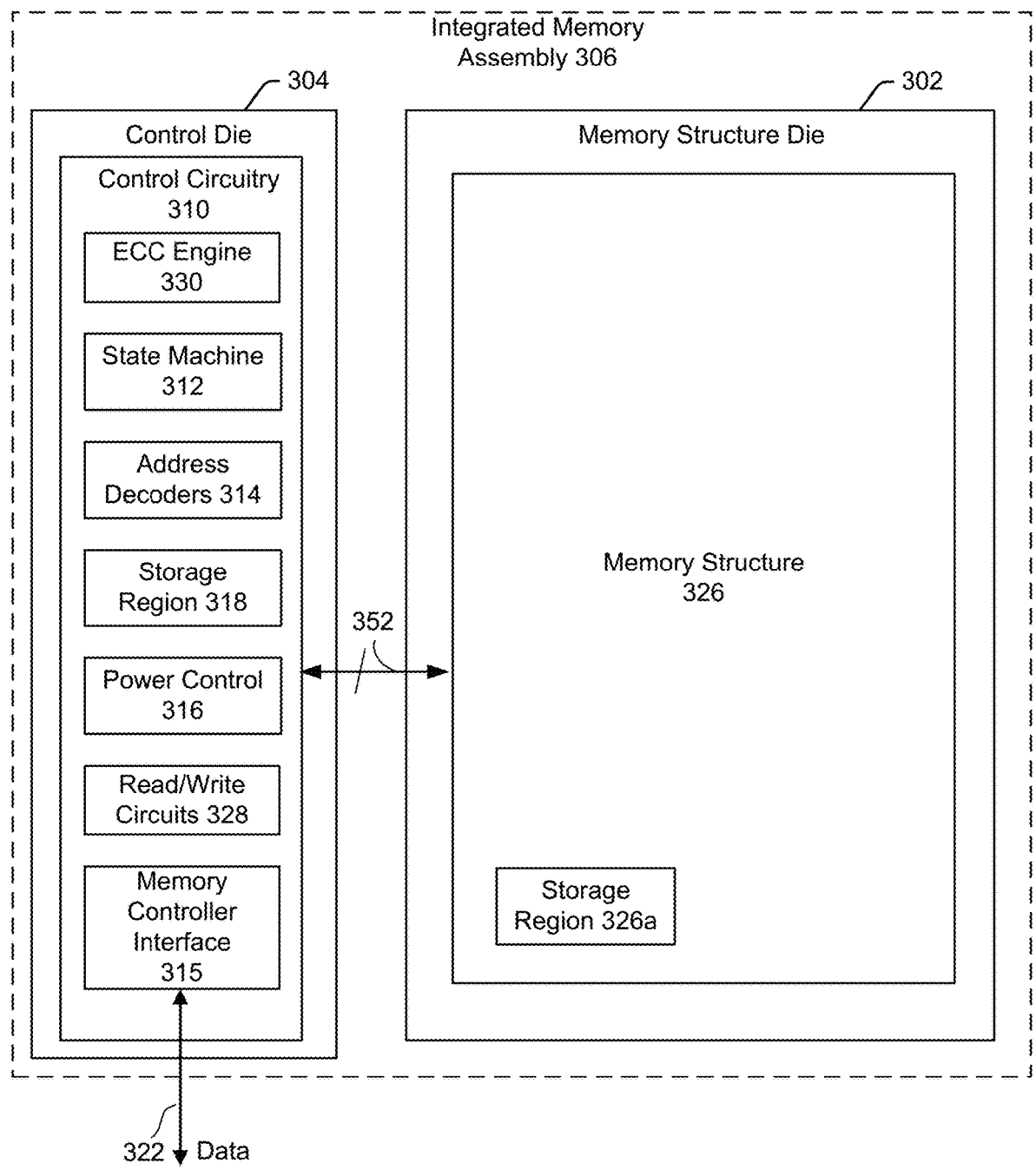
FIG. 3B is a functional block diagram of an embodiment of an integrated memory assembly.

FIG. 3B depicts a functional block diagram of one embodiment of an integrated memory assembly 306. The integrated memory assembly 306 may be used in a memory package 104 in storage system 100. In one embodiment, the integrated memory assembly 306 includes two types of semiconductor die (or more succinctly, "die"). Memory structure die 302 includes include memory structure 326. Memory structure 326 may contain non-volatile memory cells. Control die 304 includes control circuitry 310. In some embodiments, the control die 304 is configured to connect to the memory structure 326 in the memory structure die 302. For example, the control circuitry 310 is configured to be connected to non-volatile memory cells in memory structure 326 in memory structure die 302. In some embodiments, the memory structure die 302 and the control die 304 are bonded together. The control circuitry 310 includes state machine 312, an address decoder 314, power control 316, memory controller interface 315, storage region 318, and ECC engine 330. Storage region may store parameters such as read reference voltages. The control circuitry 310 also includes read/write circuits 328. In another embodiment, a portion of the read/write circuits 328 are located on control die 304, and a portion of the read/write circuits 328 are located on memory structure die 302. The term apparatus as used herein may include, but is not limited to, memory die 300, control die 304, memory package 104, storage system 100, memory controller 102, or a host system 120 that includes a storage system 100.

The ECC engine 330 is configured to decode and error correct codewords. Herein, ECC engine 330 may be referred to as an on-die ECC engine. In one embodiment, the on-die ECC engine 330 is configured to encode data bits from the memory controller 102 into codewords that contain the data bits and parity bits. The control circuitry stores the codewords in the memory structure 326. In one embodiment, the on-die ECC engine 330 is configured to decode the codewords, which are read back from the memory structure 326.

Any subset of components in the control circuitry 310 of control die 304 can be considered a control circuit. In another alternative, the control circuit comprises controller 102 and control circuitry 310 of control die 304 performing the functions described below in the flow charts. The control circuit can include hardware only or a combination of hardware and software (including firmware). For example, a controller programmed by firmware is one example of a control circuit. A control circuit can include a processor, PGA (Programmable Gate Array, FPGA (Field Programmable Gate Array), ASIC (Application Specific Integrated Circuit), integrated circuit or other type of circuit.

Pathways 352 are pathways between one or more components in the control circuitry 310 and the memory structure on memory structure die 302. A pathway may be used to provide or receive a signal (e.g., voltage, current). A pathway includes an electrically conductive path. A pathway may include one or more of, but is not limited to, a bond pad, metal interconnect, via, transistor, electrically conducting material and other material that may transfer or carry an electrical signal. A pathway may be used to provide a read reference voltage from the power control 316 to a selected word line connected to memory cells being read in the memory structure 326.

In one embodiment, integrated memory assembly 306 includes a set of input and/or output (I/O) pins that connect to memory bus 322. Memory bus 322 is depicted as being connected to memory controller interface 315.

Figure 3C:
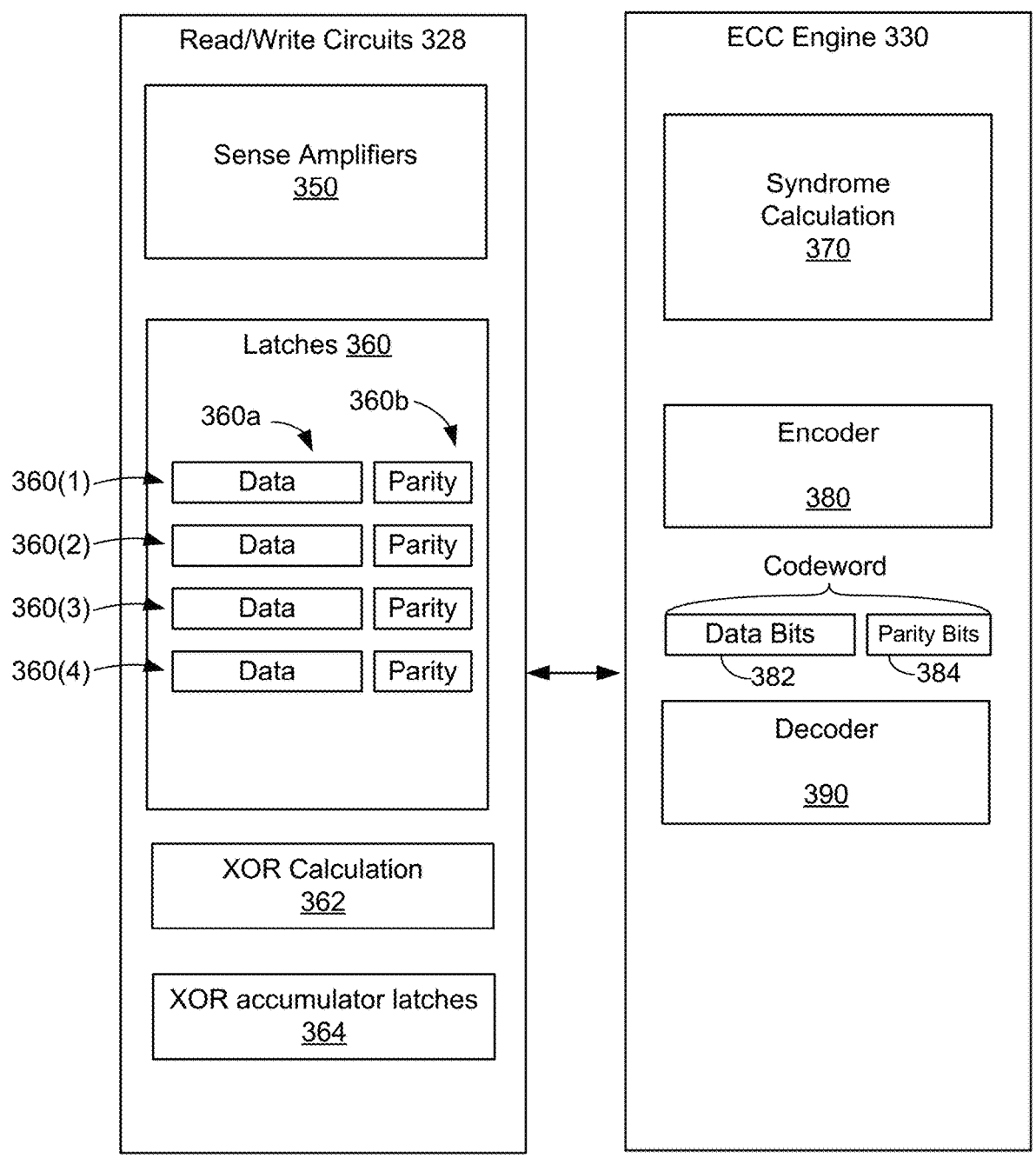
FIG. 3C is a block diagram of one embodiment of a read/write circuits and ECC of an integrated memory assembly.

FIG. 3C is a block diagram of one embodiment of the read/write circuits 328 and ECC engine 330 of the control die 304. In some embodiments, the memory die 300 has the read/write circuits 328 depicted in FIG. 3C, but does not have the ECC engine 330. The read/write circuits 328 have sense amplifiers 350 and latches 360. The latches 360 may include data latches 360a and parity latches 360b. In one embodiment, the data latches 360a store data bits of the codeword and the parity latches store parity bits of the codeword. The parity bits may include an error correction code (ECC). It is not required that there be specific latches for data bits and for parity bits. FIG. 3C depicts four sets of data latches 360(1), 360(2), 360(3), 360(4). Each set may be used to store a codeword for a different page. In an embodiment in which four bits are stored per memory cell, four pages are stored in a set of memory cells. The four pages may be referred to as a lower page (LP), lower-middle page (LMP), upper-middle page (UMP), and an upper page (UP). In another embodiment, the sense amplifiers 350 are on the memory structure die 302, but the latches 360 are on the control die 304.

The XOR calculator 362 is able to form a bit-wise XOR of two codewords. The bit-wise XOR may also be referred to as a sum modulo-2. The result of the bit-wise XOR is stored in XOR accumulator latches 364. In one embodiment, one of the codewords is taken from one of the sets 360 of latches and the other codeword is taken from the XOR accumulator latches 364.

The on-die ECC engine 330 is able to encode data bits received from the memory controller 102. In one embodiment, the on-die ECC engine 330 forms codewords that each contain data bits and parity bits. In one embodiment, the memory controller 102 provides the codewords to the control die 304. The control circuitry 310 stores the codewords into non-volatile memory cells in the memory structure 326. Upon a request from the memory controller 102 to read data, the control circuitry 310 reads codewords from the memory structure 326. The on-die ECC engine 330 is also able to decode and error correct the codewords read from the memory structure 326. In some embodiments, the on-die ECC engine 330 calculates parity bits for each unit of data (e.g., page) that is being stored. The parity bits (also referred to as an error correction code) may be stored with the unit of data (e.g., page). The combination of the unit of data and its associated parity bits are referred to as a codeword. In one embodiment, the parity bits are stored remotely from the unit of data (e.g., page).

The on-die ECC engine 330 includes syndrome calculation logic 370, an encoder 380, and a decoder 390. The encoder 380 is configured to encode data using an ECC scheme, such as a Reed Solomon encoder, a Bose-Chaudhuri-Hocquenghem (BCH) encoder, a low-density parity check (LDPC) encoder, a Turbo Code encoder, an encoder configured to encode one or more other ECC encoding schemes, or any combination thereof. The encoder 380 may form a codeword, which contains data bits 382 and parity bits 384. The data bits may be provided by the memory controller 102.

In one embodiment, the data bits 382 are stored in the data latches 360a, and the parity bits 384 are stored in the parity latches 360b. Based on the bits in the latches 360, the sense amplifiers 350 may control bit line voltages in the memory structure 326 when the memory cells are being programmed. In this manner, the codewords may be programmed into memory cells in the memory structure 326. It will be appreciated that other voltages may also be applied to the memory structure 326, such applying a program voltage to memory cells that are selected for programming.

The decoder 390 is configured to decode the codewords that were stored in the memory structure die 302. In one embodiment, sense amplifiers 350 sense bit lines in the memory structure 326 in order to read a codeword. The sense amplifiers 350 may store the read codeword into latches 360. The decoder 390 is able to detect and correct errors in the codeword. In one embodiment, the decoder 390 is a relatively low power decoder, as compared to a decoder on the memory controller 102. In one embodiment, the decoder on the memory controller 102 is able to correct more bit errors in the codeword than can typically be corrected by decoder 390. Thus, decoder 390 may provide a power versus error correction capability tradeoff. For example, decoder 390 may be very efficient with respect to power consumption, but at the expense of possibly not being able to correct a high number of errors in a codeword.

In some embodiments, the decoder 390 is based on a sparse bipartite graph having bit (or variable) nodes and check nodes. The decoder 390 may pass messages between the bit nodes and the check nodes. Passing a message between a bit node and a check node is accomplished by performing a message passing computation, in some embodiments. The message passing computation may be based on believe propagation.

The syndrome calculation logic 370 is able to determine a SW for codewords. The SW refers to the number of parity check equations that are unsatisfied. Parity check equations are discussed in more detail in connection with FIGS. 3D and 3E. The SW of a codeword may correlate with the BER of that codeword. Thus, the control die 304 may estimate a BER for a codeword based on the SW. In one embodiment, the syndrome calculation logic 370 is implemented in hardware. The SW can be determined without fully decoding a codeword. Hence, the SW can be calculated in less time and with less power than for decoding a codeword.

Figures 3D, 3E:
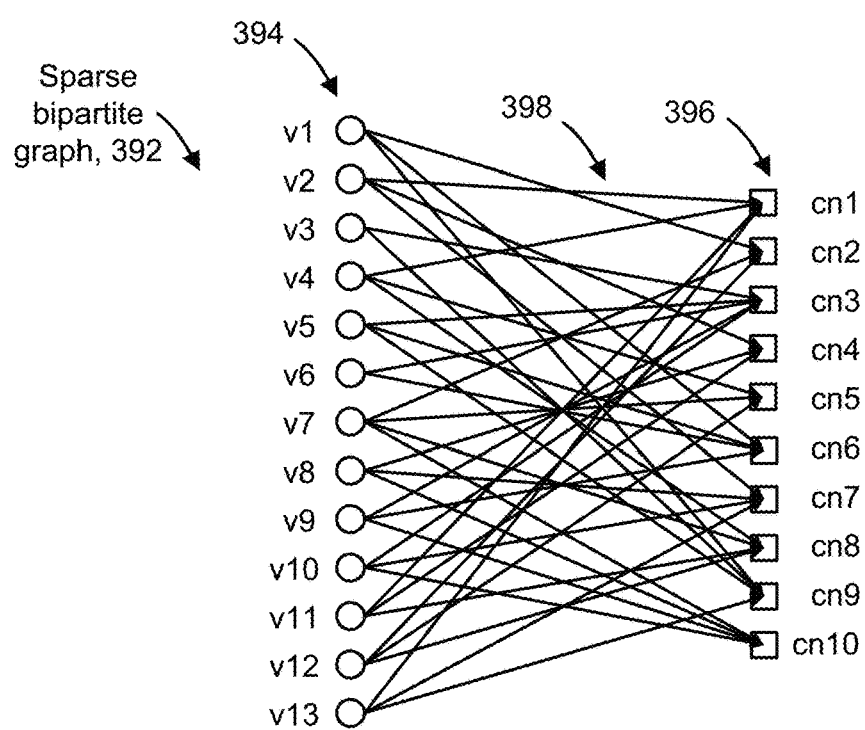
FIG. 3D depicts an example of a sparse parity check matrix H.
FIG. 3E depicts a sparse bipartite graph which corresponds to the sparse parity check matrix of FIG. 3D.

As noted above, in some embodiments, the on-die ECC engine 330 uses a sparse parity check matrix. Note that ECC 226/256 on the controller 102 could also implement a sparse parity check matrix. FIG. 3D depicts an example of a sparse parity check matrix H (which may also be represented as a sparse bipartite graph). The matrix includes M rows and K+M columns, which are in correspondence with K information bits and M parity bits in each codeword of length N=K+M. Further, the parity bits are defined such that M parity check equations are satisfied, where each row of the matrix represents a parity check equation.

FIG. 3E depicts a sparse bipartite graph 392 which corresponds to the sparse parity check matrix of FIG. 3D. Specifically, the code can be defined by a sparse bipartite graph G=(V,C,E) with a set V of N bit nodes 394 (N=13 in this example), a set C of M check nodes 396 (M=10 in this example) and a set E (E=38 in this example) of edges 398 connecting bit nodes 394 to check nodes 396. The bit nodes correspond to the codeword bits and the check nodes correspond to parity-check constraints on the bits. A bit node 394 is connected by edges 398 to the check nodes 396 it participates in.

During decoding, one embodiment of the decoder 390 attempts to satisfy the parity checks. In this example, there are ten parity checks, as indicated by the check nodes cn1 through cn10. The first parity check at cn1 determines if $v2 \oplus v4 \oplus v11 \oplus v13 = 0$, where "$\oplus$" denotes the exclusive-or (XOR) logical operation. This check is satisfied if there is an even number of "1" in bits corresponding to variable nodes v2, v4, v11 and v13. This check is denoted by the fact that arrows from variable nodes v2, v4, v11 and v13 are connected to check node cn1 in the bi-partite graph. The second parity check at cn2 determines if $v1 \oplus v7 \oplus v12 = 0$, the third parity check at cn3 determines if $v3 \oplus v5 \oplus v6 \oplus v9 \oplus v10 = 0$, the fourth parity check at cn4 determines if $v2 \oplus v8 \oplus v11 = 0$, the fifth parity check at cn5 determines if $v4 \oplus v7 \oplus v12 = 0$, the sixth parity check at cn6 determines if $v1 \oplus v5 \oplus v6 \oplus v9 = 0$, the seventh parity check at cn7 determines if $v2 \oplus v8 \oplus v10 \oplus v13 = 0$, the eighth parity check at cn8 determines if $v4 \oplus v7 \oplus v11 \oplus v12=0$, the ninth parity check at cn9 determines if $v1 \oplus v3 \oplus v5 \oplus v13=0$ and the tenth parity check at cn10 determines if $v7 \oplus v8 \oplus v9 \oplus v10=0$.

In one embodiment, the decoder 390 uses an iterative probabilistic decoding process involving iterative message passing decoding algorithms. These algorithms operate by exchanging messages between bit nodes and check nodes over the edges of the underlying bipartite graph representing the code.

The decoder 390 may be provided with initial estimates of the codeword bits (based on the content that is read from the memory structure 326). These initial estimates may be refined and improved by imposing the parity-check constraints that the bits should satisfy as a valid codeword. This may be done by exchanging information between the bit nodes representing the codeword bits and the check nodes representing parity-check constraints on the codeword bits, using the messages that are passed along the graph edges.

Figure 4:
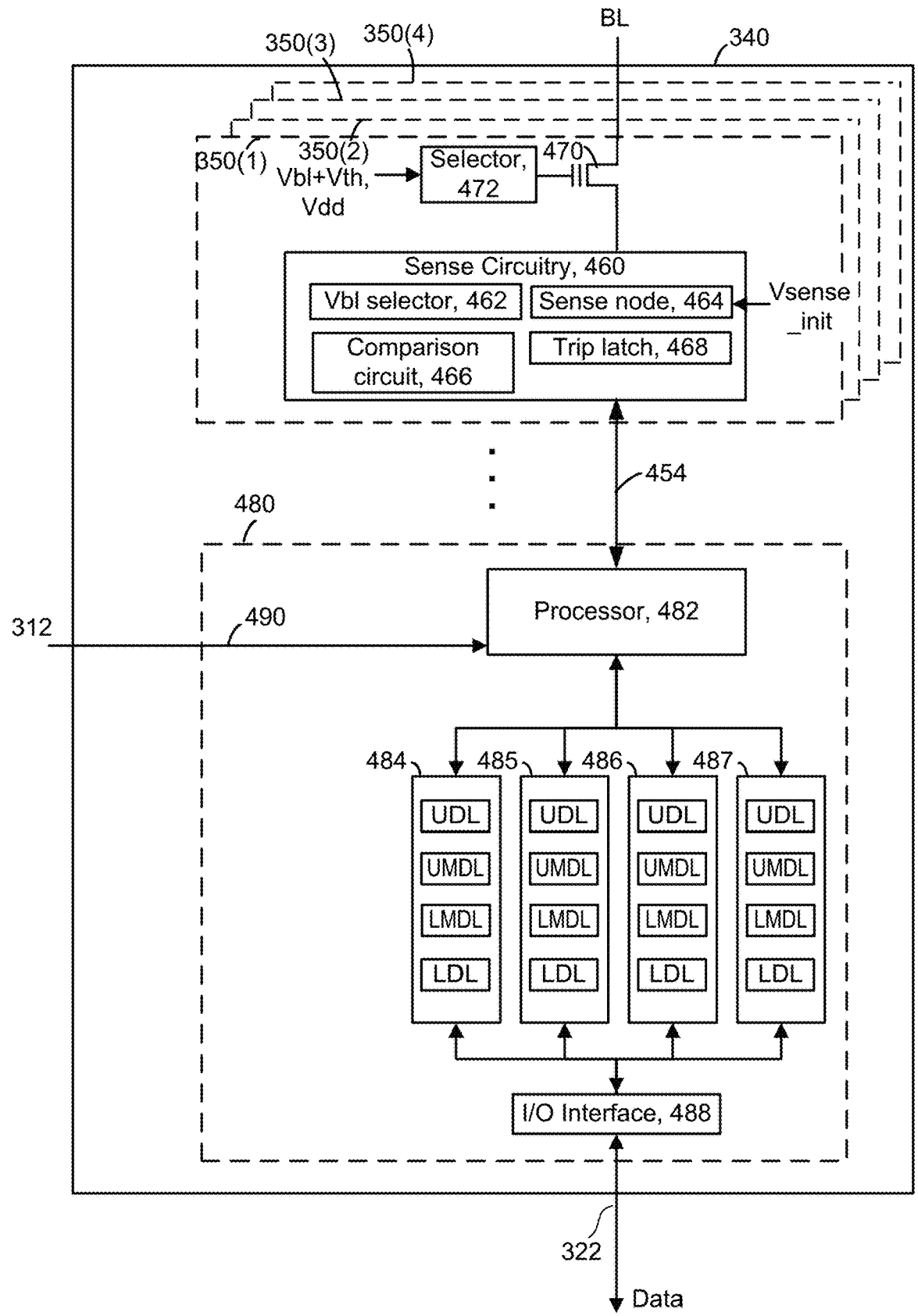
FIG. 4 is a block diagram depicting one embodiment of a sense block.

FIG. 4 is a block diagram depicting one embodiment of a sense block 340. The sense block is part of the read/write circuits 328. An individual sense block 340 is partitioned into one or more core portions, referred to as sense circuits or sense amplifiers 350(1)-350(4), and a common portion, referred to as a management circuitry 480. In one embodiment, there will be a separate sense circuit for each bit line/NAND string and one common management circuitry 480 for a set of multiple, e.g., four or eight, sense circuits. Each of the sense circuits in a group communicates with the associated managing circuit via data bus 454. Thus, there are one or more managing circuits which communicate with the sense circuits of a set of storage elements (memory cells).

The sense amplifier 350(1), as an example, comprises sense circuitry 460 that performs sensing by determining whether a conduction current in a connected bit line is above or below a predetermined threshold level. The sensing can occur in a read or verify operation. The sense circuit also supplies a bit line voltage during the application of a program voltage in a program operation. Note that other circuitry (e.g., power control 316 under control of state machine 312) may control the application of voltages to the word lines during read or program. Thus, state machine 312 may control power control 316 to control the timing of read reference voltages (as well as other voltages) to the word lines.

The sense circuitry 460 may include a Vbl selector 462, a sense node 464, a comparison circuit 466 and a trip latch 468. During the application of a program voltage, the Vbl selector 462 can pass a program enable voltage (e.g., V_pgm_enable) or a program-inhibit voltage (e.g., Vbl_inh) to a bit line connected to a memory cell.

A transistor 470 (e.g., an nMOS) can be configured as a pass gate to pass Vbl from the Vbl selector 462, by setting the control gate voltage of the transistor sufficiently high, e.g., higher than the Vbl passed from the Vbl selector. For example, a selector 472 may pass a power supply voltage Vdd, e.g., 3-4 V to the control gate of the transistor 470.

The sense amplifier 350(1) is configured to control the timing of when the voltages are applied to the bit line. During sensing operations such as read and verify operations, the bit line voltage is set by the transistor 470 based on the voltage passed by the selector 472. The bit line voltage is roughly equal to the control gate voltage of the transistor minus its Vt (e.g., 3 V). For example, if Vbl+Vt is passed by the selector 472, the bit line voltage will be Vbl. This assumes the source line is at 0 V. The transistor 470 clamps the bit line voltage according to the control gate voltage and acts as a source-follower rather than a pass gate.

The Vbl selector 462 may pass a relatively high voltage such as Vdd which is higher than the control gate voltage on the transistor 470 to provide the source-follower mode. During sensing, the transistor 470 thus charges up the bit line.

In one approach, the selector 472 of each sense amplifier can be controlled separately from the selectors of other sense amplifiers, to pass Vbl or Vdd. The Vbl selector 462 of each sense amplifier can also be controlled separately from the Vbl selectors of other sense amplifiers.

During sensing, the sense node 464 is charged up to an initial voltage such as Vsense_init=3 V. The sense node is then connected to the bit line via the transistor 470, and an amount of decay of the sense node is used to determine whether a memory cell is in a conductive or non-conductive state. In one embodiment, a current that flows in the bit line discharges the sense node (e.g., sense capacitor). The length of time that the sense node is allowed to decay may be referred to herein as an "integration time." The comparison circuit 466 is used to compare the sense node voltage to a trip voltage at a sense time. If the sense node voltage decays below the trip voltage Vtrip, the memory cell is in a conductive state and its Vt is at or below the voltage of the verification signal. If the sense node voltage does not decay below Vtrip, the memory cell is in a non-conductive state and its Vt is above the voltage of the verification signal. The sense amplifier 350(1) includes a trip latch 468 that is set by the comparison circuit 466 based on whether the memory cell is in a conductive or non-conductive state. The data in the trip latch can be a bit which is read out by the processor 482.

The management circuitry 480 comprises a processor 482, four example sets of data latches 484, 485, 486, 487 and an I/O Interface 488 coupled between the sets of data latches and memory bus 322 (memory bus may connect to the memory controller 102). One set of data latches, e.g., comprising individual latches LDL, LMDL, UMDL, and UDL, can be provided for each sense amplifier. In some cases, fewer or additional data latches may be used. LDL stores a bit for a lower page of data, LMDL stores a bit for a lower-middle page of data, UMDL stores a bit for an upper-middle page of data, and UDL stores a bit for an upper page of data. This is in a sixteen level or four bits per memory cell memory device. In one embodiment, there are eight levels or three bits per memory cell.

The processor 482 performs computations, such as to determine the data stored in the sensed memory cell and store the determined data in the set of data latches. For example, processor 482 may determine bits in raw codewords, and store the bits of the raw codewords in latches 484-487. Each set of data latches 484-487 is used to store data bits determined by processor 482 during a read operation, and to store data bits imported from the memory bus 322 during a program operation which represent write data meant to be programmed into the memory. I/O interface 488 provides an interface between data latches 484-487 and the memory bus 322.

The processor 482 may also determine data state information for respective memory cells based on the information in the latches 484-487. During reading, the operation of the system is under the control of state machine 312 that controls the supply of different control gate voltages to the addressed memory cell. As it steps through the various predefined control gate voltages corresponding to the various memory states supported by the memory, the sense circuit may trip at one of these voltages and a corresponding output will be provided from sense circuit to processor 482 via the data bus 454. At that point, processor 482 determines the resultant memory state by consideration of the tripping event(s) of the sense circuit and the information about the applied control gate voltage from the state machine via input lines 490. It then computes a binary encoding for the memory state and stores the resultant data bits into data latches 484-487.

The processor 482 may also form an XOR codeword, or at least a portion thereof, based on contents of the latches. For example, a bitwise XOR may be performed between content of the UDL latches and XOR accumulator latches (not depicted in FIG. 4). Hence, the processor 482 may serve as at least a portion of XOR calculation (see FIG. 3C, 362).

Some implementations can include multiple processors 482. In one embodiment, each processor 482 will include an output line (not depicted) such that each of the output lines is wired-OR'd together. In some embodiments, the output lines are inverted prior to being connected to the wired-OR line. This configuration enables a quick determination during a program verify test of when the programming process has completed because the state machine receiving the wired-OR can determine when all bits being programmed have reached the desired level. For example, when each bit has reached its desired level, a logic zero for that bit will be sent to the wired-OR line (or a data one is inverted). When all bits output a data 0 (or a data one inverted), then the state machine knows to terminate the programming process. Because each processor communicates with four sense amplifiers, the state machine needs to read the wired-OR line four times, or logic is added to processor 482 to accumulate the results of the associated bit lines such that the state machine need only read the wired-OR line one time. Similarly, by choosing the logic levels correctly, the global state machine can detect when the first bit changes its state and change the algorithms accordingly.

During program or verify operations for memory cells, the data to be programmed (write data) is stored in the set of data latches 484-487 from the memory bus 322, in the LDL, LMDL, UMDL, and UDL latches, in a four-bit per memory cell implementation.

Each set of data latches 484-487 may be implemented as a stack of data latches for each sense amplifier. In some implementations, the data latches are implemented as a shift register so that the parallel data stored therein is converted to serial data for memory bus 322, and vice versa. All the data latches corresponding to the read/write block of memory cells can be linked together to form a block shift register so that a block of data can be input or output by serial transfer. In particular, the bank of read/write circuits is adapted so that each of its set of data latches will shift data in to or out of the data bus in sequence as if they are part of a shift register for the entire read/write block.

Figure 5A:
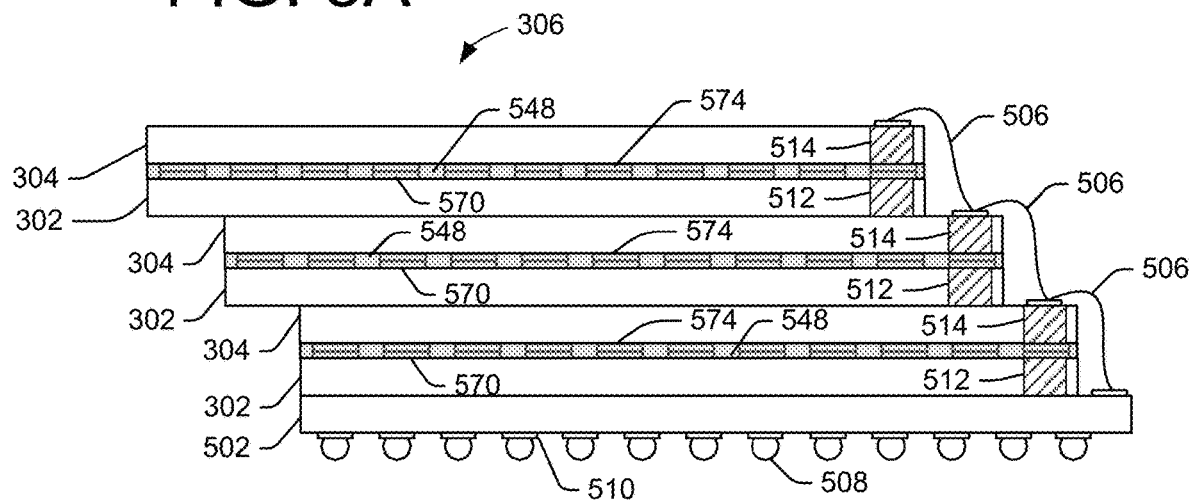
FIG. 5A depicts a side view of an embodiment of an integrated memory assembly stacked on a substrate.

In some embodiments, there is more than one control die 304 and more than one memory structure die 302 in an integrated memory assembly 306. In some embodiments, the integrated memory assembly 306 includes a stack of multiple control die 304 and multiple memory structure die 302. FIG. 5A depicts a side view of an embodiment of an integrated memory assembly 306 stacked on a substrate 502 (e.g., a stack comprising control dies 304 and memory structure dies 302). The integrated memory assembly 306 has three control dies 304 and three memory structure dies 302. In some embodiments, there are more than three memory structure dies 302 and more than three control die 304.

Each control die 304 is affixed (e.g., bonded) to at least one of the memory structure dies 302. Some of the bond pads 570, 574, are depicted. There may be many more bond pads. A space between two dies 302, 304 that are bonded together is filled with a solid layer 548, which may be formed from epoxy or other resin or polymer. This solid layer 548 protects the electrical connections between the dies 302, 304, and further secures the dies together. Various materials may be used as solid layer 548, but in embodiments, it may be Hysol epoxy resin from Henkel Corp., having offices in California, USA.

The integrated memory assembly 306 may for example be stacked with a stepped offset, leaving the bond pads at each level uncovered and accessible from above. Wire bonds 506 connected to the bond pads connect the control die 304 to the substrate 502. A number of such wire bonds may be formed across the width of each control die 304 (i.e., into the page of FIG. 5A).

A memory die through silicon via (TSV) 512 may be used to route signals through a memory structure die 302. A control die through silicon via (TSV) 514 may be used to route signals through a control die 304. The TSVs 512, 514 may be formed before, during or after formation of the integrated circuits in the semiconductor dies 302, 304. The TSVs may be formed by etching holes through the wafers. The holes may then be lined with a barrier against metal diffusion. The barrier layer may in turn be lined with a seed layer, and the seed layer may be plated with an electrical conductor such as copper, although other suitable materials such as aluminum, tin, nickel, gold, doped polysilicon, and alloys or combinations thereof may be used.

Solder balls 508 may optionally be affixed to contact pads 510 on a lower surface of substrate 502. The solder balls 508 may be used to electrically and mechanically couple the integrated memory assembly 306 to a host device such as a printed circuit board. Solder balls 508 may be omitted where the integrated memory assembly 306 is to be used as an LGA package. The solder balls 508 may form a part of the interface between the integrated memory assembly 306 and the memory controller 102.

Figure 5B:
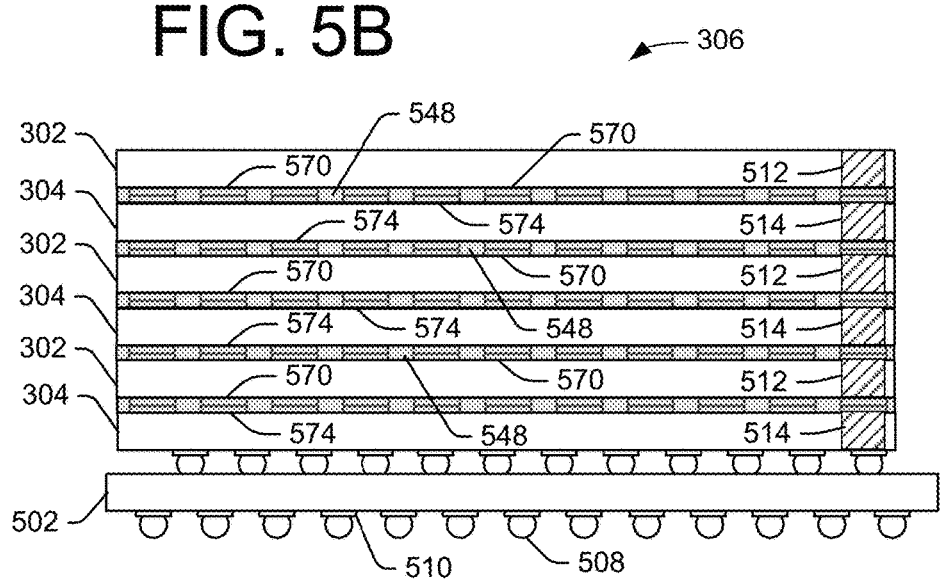
FIG. 5B depicts a side view of an embodiment of an integrated memory assembly stacked on a substrate.

FIG. 5B depicts a side view of an embodiment of an integrated memory assembly 306 stacked on a substrate 502. The integrated memory assembly 306 has three control die 304 and three memory structure die 302. In some embodiments, there are many more than three memory structure die 302 and many more than three control die 304. In this example, each control die 304 is bonded to at least one memory structure die 302. Optionally, a control die 304 may be bonded to two memory structure die 302.

Some of the bond pads 570, 574 are depicted. There may be many more bond pads. A space between two dies 302, 304 that are bonded together is filled with a solid layer 548, which may be formed from epoxy or other resin or polymer. In contrast to the example in FIG. 5A, the integrated memory assembly 306 in FIG. 5B does not have a stepped offset. A memory die through silicon via (TSV) 512 may be used to route signals through a memory structure die 302. A control die through silicon via (TSV) 514 may be used to route signals through a control die 304.

Solder balls 508 may optionally be affixed to contact pads 510 on a lower surface of substrate 502. The solder balls 508 may be used to electrically and mechanically couple the integrated memory assembly 306 to a host device such as a printed circuit board. Solder balls 508 may be omitted where the integrated memory assembly 306 is to be used as an LGA package.

As has been briefly discussed above, the control die 304 and the memory structure die 302 may be bonded together. Bond pads on each die 302, 304 may be used to bond the two dies together. In some embodiments, the bond pads are bonded directly to each other, without solder or other added material, in a so-called Cu-to-Cu bonding process. In a Cu-to-Cu bonding process, the bond pads are controlled to be highly planar and formed in a highly controlled environment largely devoid of ambient particulates that might otherwise settle on a bond pad and prevent a close bond. Under such properly controlled conditions, the bond pads are aligned and pressed against each other to form a mutual bond based on surface tension. Such bonds may be formed at room temperature, though heat may also be applied. In embodiments using Cu-to-Cu bonding, the bond pads may be about 5 µm square and spaced from each other with a pitch of 5 µm to 5 µm. While this process is referred to herein as Cu-to-Cu bonding, this term may also apply even where the bond pads are formed of materials other than Cu.

When the area of bond pads is small, it may be difficult to bond the semiconductor dies together. The size of, and pitch between, bond pads may be further reduced by providing a film layer on the surfaces of the semiconductor dies including the bond pads. The film layer is provided around the bond pads. When the dies are brought together, the bond pads may bond to each other, and the film layers on the respective dies may bond to each other. Such a bonding technique may be referred to as hybrid bonding. In embodiments using hybrid bonding, the bond pads may be about 5 µm square and spaced from each other with a pitch of 1 µm to 5 µm. Bonding techniques may be used providing bond pads with even smaller sizes and pitches.

Some embodiments may include a film on surface of the dies 302, 304. Where no such film is initially provided, a space between the dies may be under filled with an epoxy or other resin or polymer. The under-fill material may be applied as a liquid which then hardens into a solid layer. This under-fill step protects the electrical connections between the dies 302, 304, and further secures the dies together. Various materials may be used as under-fill material, but in embodiments, it may be Hysol epoxy resin from Henkel Corp., having offices in California, USA.

Figure 6:
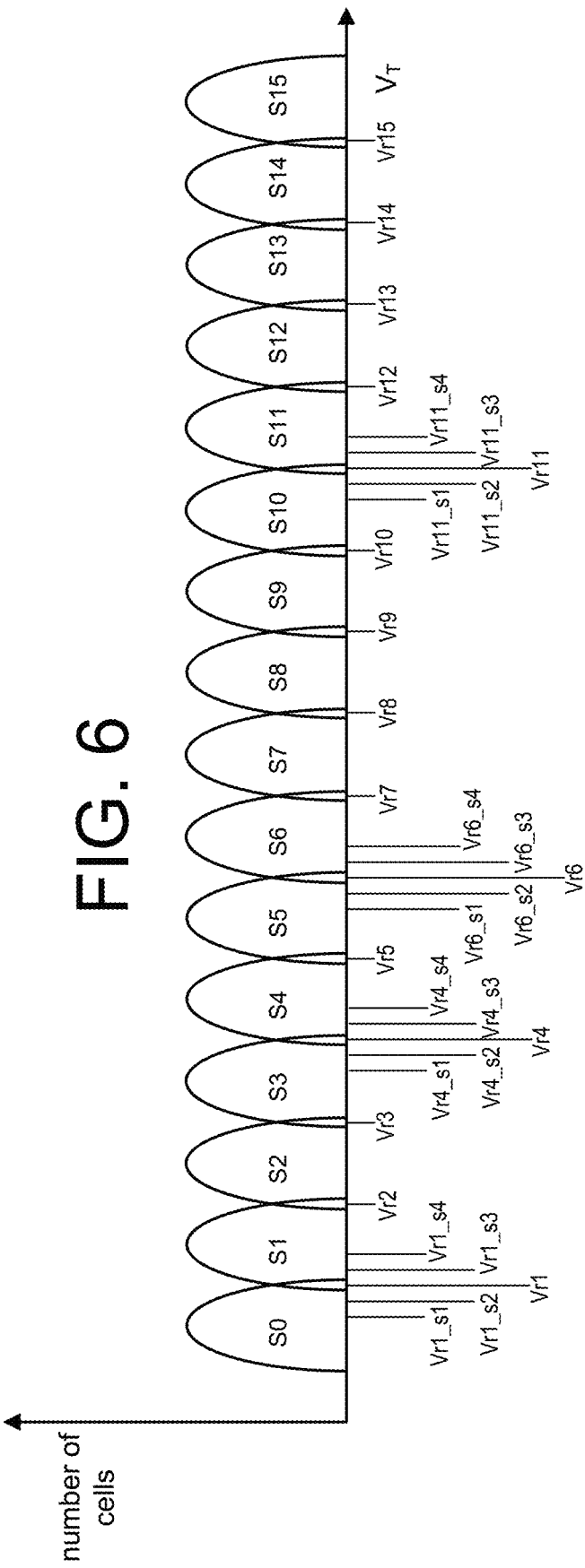
FIG. 6 illustrates example threshold voltage distributions for the memory array when each memory cell stores four bits of data.

At the end of a successful programming process, the threshold voltages of the memory cells should be within one or more distributions of threshold voltages for programmed memory cells or within a distribution of threshold voltages for erased memory cells, as appropriate. FIG. 6 illustrates example threshold voltage distributions for the memory array when each memory cell stores four bits of data. Other embodiments, however, may use other data capacities per memory cell (e.g., such as one, two, three, or five bits of data per memory cell). FIG. 6 shows 15 hard bit (HB) read reference voltages, Vr1-Vr15 for reading data from memory cells. The set of memory cells may be connected to the same word line. Each HB read reference level is used to distinguish between two adjacent threshold voltage distributions. Stated another way, each HB read reference level is used to distinguish between two adjacent data states. For example, HB read reference level Vr4 is used to distinguish between data states S3 and S4. By testing (e.g., performing sense operations) whether the threshold voltage of a given memory cell is above or below the 15 read reference voltages, the system can determine what data state (i.e., S0, S1, S2, S3 . . . ) a memory cell is in.

FIG. 6 depicts that there may be some overlap between the data states S0-S15. The overlap may occur due to factors such as memory cells losing charge (and hence dropping in threshold voltage). FIG. 6 depicts an example in which four bits are stored per memory cell. Thus, four pages may be stored in a set of memory cells. The set of memory cells may be connected to the same word line. These pages may be referred to as a lower page, lower-middle page, upper-middle page, and upper page. In one embodiment, in order to read the lower page, the memory cells are sensed using four different HB read reference voltages. For example, the memory cells may be sensed at Vr1, Vr4, Vr6, and Vr11.

There are many ways to measure the conduction current of a memory cell during a read or verify operation. In one example, the conduction current of a memory cell is measured by the rate it discharges or charges a dedicated capacitor in the sense amplifier. In another example, the conduction current of the selected memory cell allows (or fails to allow) the NAND string that includes the memory cell to discharge a corresponding bit line. The voltage on the bit line is measured after a period of time to see whether it has been discharged or not. Note that the technology described herein can be used with different methods known in the art for verifying/reading. Other read and verify techniques known in the art can also be used.

FIG. 6 also depicts soft bit (SB) reference voltages associated with four of the HB reference voltages. There is one set of SB reference voltages grouped around each of Vr1, Vr4, Vr6, and Vr11. For example, the set of SB reference voltages Vr1_s1, Vr1_s2, Vr1_s3, and Vr1_s4 are grouped around HB reference voltages Vr1; the set of SB reference levels Vr4_s1, Vr4_s2, Vr4_s3, and Vr4_s4 are grouped around HB reference voltages Vr4; the set of SB reference levels Vr6_s1, Vr6_s2, Vr6_s3, and Vr6_s4 are grouped around HB reference voltages Vr6; and the set of SB reference levels Vr11_s1, Vr11_s2, Vr11_s3, and Vr11_s4 are grouped around HB reference voltages Vr11. There may be SB reference voltages associated with the other HB reference voltages, but they are not depicted in FIG. 6. In FIG. 6 there are four SB reference voltages associated with each corresponding HB reference voltage, but there could be more or fewer SB reference levels associated with a HB reference voltage.

Note that although some embodiments disclosed herein are directed to memory cells in which the state is represented by a threshold voltage (Vt) of the memory cell, the state of the memory cell may be represented by another physical parameter including, but not limited to, resistance or conductance. For example, in FIG. 6, the data states are represented by Vt distributions. However, for other types of memory cells the data states may be represented by resistance distributions or conductance distributions.

In some embodiments, the soft bit reference voltages are used to read data in the memory cells when the ECC engine is not able to decode a codeword stored in the memory cells using data sensed using the hard bit reference voltages. Typically, there is a set of soft bit reference voltages for each hard bit reference voltage. The soft bit reference voltages are reference voltages at slightly higher voltages and slightly lower voltages that a corresponding hard bit reference voltage. The set of soft bit reference voltages are used to generate "soft" reliability information, which increases the correction capability of the decoder. Sensing at the soft bit reference voltages generates "soft-bits", which indicate whether the physical parameter (e.g., Vt, resistance) of a memory cell close to the hard bit reference level making the hard bit for that memory cell less reliable, or far from the hard bit reference level making the hard bit more reliable. In other words, if the soft reliability information indicates that a memory cell has its value for a physical parameter (e.g., Vt, resistance) close to the hard bit reference level, then this is considered less reliable than if the soft reliability information indicates that a memory cell has its value for a physical parameter (e.g., Vt, resistance) far from the hard bit reference level.

Figure 7:
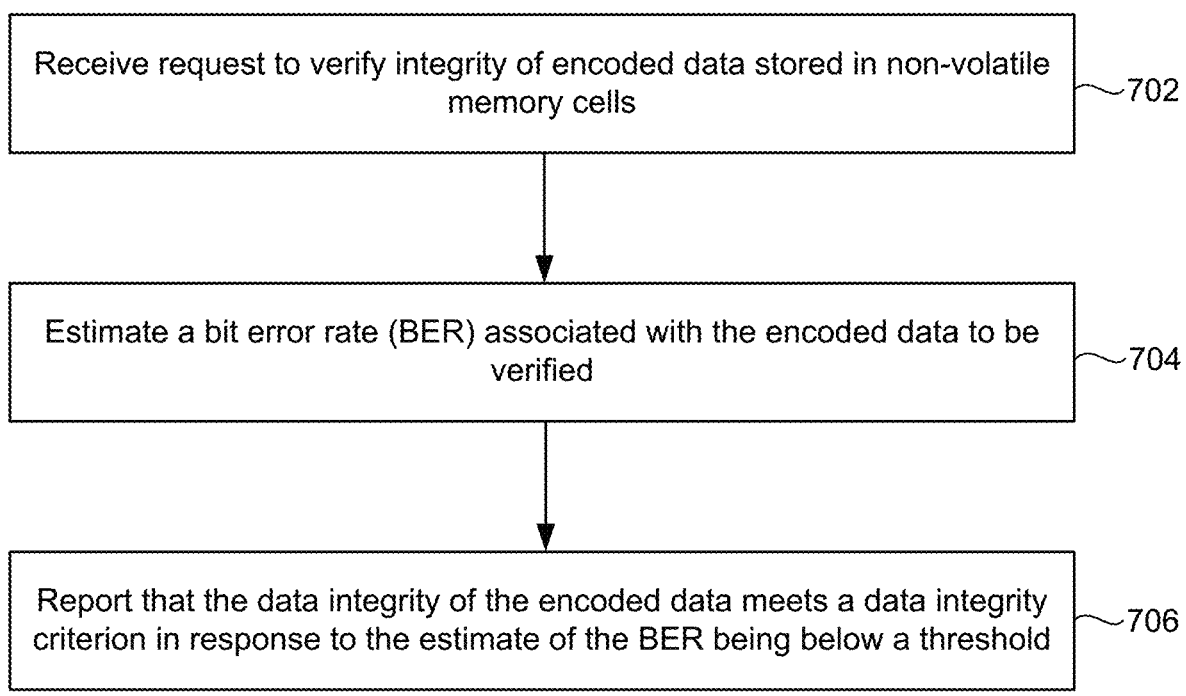
FIG. 7 is a flowchart depicting one embodiment of a process of verifying integrity of data stored in non-volatile memory cells.

FIG. 7 is a flowchart depicting one embodiment of a process 700 of verifying integrity of data stored in non-volatile memory cells. The process 700 may be performed by, for example, storage system 100, memory controller 102, memory die 300, control die 304, or integrated memory assembly 306.

Step 702 includes receiving a request to verify integrity of encoded data stored in non-volatile memory cells. By encoded data it is meant that the data is encoded as one or more ECC codewords. In one embodiment, the host system 120 provides the request to storage system 100. The storage system 100 may receive the request by way of PCIe interface to host 120. In one embodiment, the host system 120 provides an NVMe Verify command. In one embodiment, the host system 120 provides an NVMe Get LBA Status command. However, the request to verify the data integrity is not limited to command from an NVM Express™ Specification.

In one embodiment, the request identifies either an LBA or a set of LBAs (such as a range of LBAs) to be verified. The memory controller 102 may translate the LBA(s) into one or more physical addresses in the memory structure 326. The memory controller 102 then sends one or more requests to the memory die 300 or control die 304. The die may receive the request by way of memory controller interface 315. The request to the die 300, 304 may depend on implementation. Further details are discussed below.

Step 704 includes estimating a BER associated with the encoded data to be verified. The encoded data has one or more ECC codewords. In one embodiment, the BER is estimated without fully decoding the encoded data. To fully decode the encoded data means to determine a valid codeword for all of the codewords. One way in which the data is not fully decoded is to stop an ECC decoder prior to converging to a valid codeword. Another way in which the data is not fully decoded is to determine a valid codeword for only a subset (but not all) of the codewords.

In one embodiment, the BER is estimated by determining a SW of a codeword in the encoded data. In one embodiment, the BER is estimated by forming a single XOR page from multiple pages of encoded data and decoding the single XOR page to determine a BER for the XOR page. In one embodiment, the BER is estimated by decoding a sample of the encoded data. Hence, in each of these examples the BER may be estimated without fully decoding the data. Therefore, both time and power is saved. Also, in some embodiments, data transfer between the control die (or memory die) and the memory controller is reduced. Step 704 could be performed by the memory controller 102 or the control die 304.

Step 706 includes reporting that the data integrity of the encoded data meets a data integrity criterion in response to the estimate of the BER being below a threshold. Therefore, the integrity of the data is verified without fully decoding the data, thereby saving both time and power. In one embodiment, memory controller 102 provides a command response to the host system 120. In embodiments in which the verify request is an NVMe verify command the memory controller 102 may place a command response onto an NVMe command response queue.

In some embodiments, the data integrity criterion is based on whether a read command would have resulted in a certain type of error being reported to the host system 120. Examples of possible errors include, but are not limited to, a correctable ECC (CECC) and an uncorrectable ECC (UECC). In one embodiment, the data integrity criterion is that data is correctable by an ECC decoder, in which case the data integrity criterion is met even if there is a CECC (but not if there is a UECC). In one embodiment, the data integrity criterion is that the data has no bit errors, in which case the data integrity criterion is not met if there is a CECC. In some embodiments, step 706 will report that the data integrity criterion is met by reporting no error. In some embodiments, step 706 will report that the data integrity criterion is met by reporting a correctable error (e.g., CECC). Reporting that the data integrity is met is not limited to reporting either no error or CECC.

In some cases the storage system 100 will fully decode the encoded data to determine whether the data integrity criterion is met. For example, if the BER in step 704 is greater than the threshold, then the storage system may fully decode the data to determine whether the data integrity criterion is met. Further details are discussed below.

In some cases, the storage system 100 may perform a data scrub of the data that was verified. For example, if there was a CECC, the storage system may re-write the data after correcting any errors. The data may be written to a new location for some technologies such as NAND.

Note that process 700 describes a scenario in which the data integrity criterion is met. In some cases, the data integrity criterion is not met, in which case step 706 is replaced with a step of reporting to the host system 120 that the data integrity criterion is not met. In this case, an error (e.g., UECC or possibly CECC depending on the data criterion) may be reported to the requestor (e.g., host system 120). Hence, an error may be reported in response to the verify command if responding to a read command would have resulted in an error being returned to the requestor. The error that is reported for the verify command could be different from the error that would have been reported in response to a read command.

In one embodiment, the storage system 100 determines a SW of the data to be verified in order to respond to the verify command. The SW may be used to estimate the BER. The SW is the number of unsatisfied parity checks. The SW option is applicable for an ECC having a low-density parity-check matrix. The BER of an ECC codeword can be estimated as in Equation 1.

$$\overline{BER} = \frac{1 - (1 - 2*W/M)^{1/d}}{2} \qquad \text{Eq. 1}$$

In Equation 1, W is the number of unsatisfied parity-checks, M is the total number of parity-checks and d is the number of bits involved in each parity-check (assuming it is fixed). In practice, such computations can done offline and a Look-Up-Table (LUT) may be used for translating the number of unsatisfied parity-checks W to the estimated BER. Advantages of this over a full decoding is that it is fast and completes in a deterministic time. It also has low power consumption.

Figure 8:
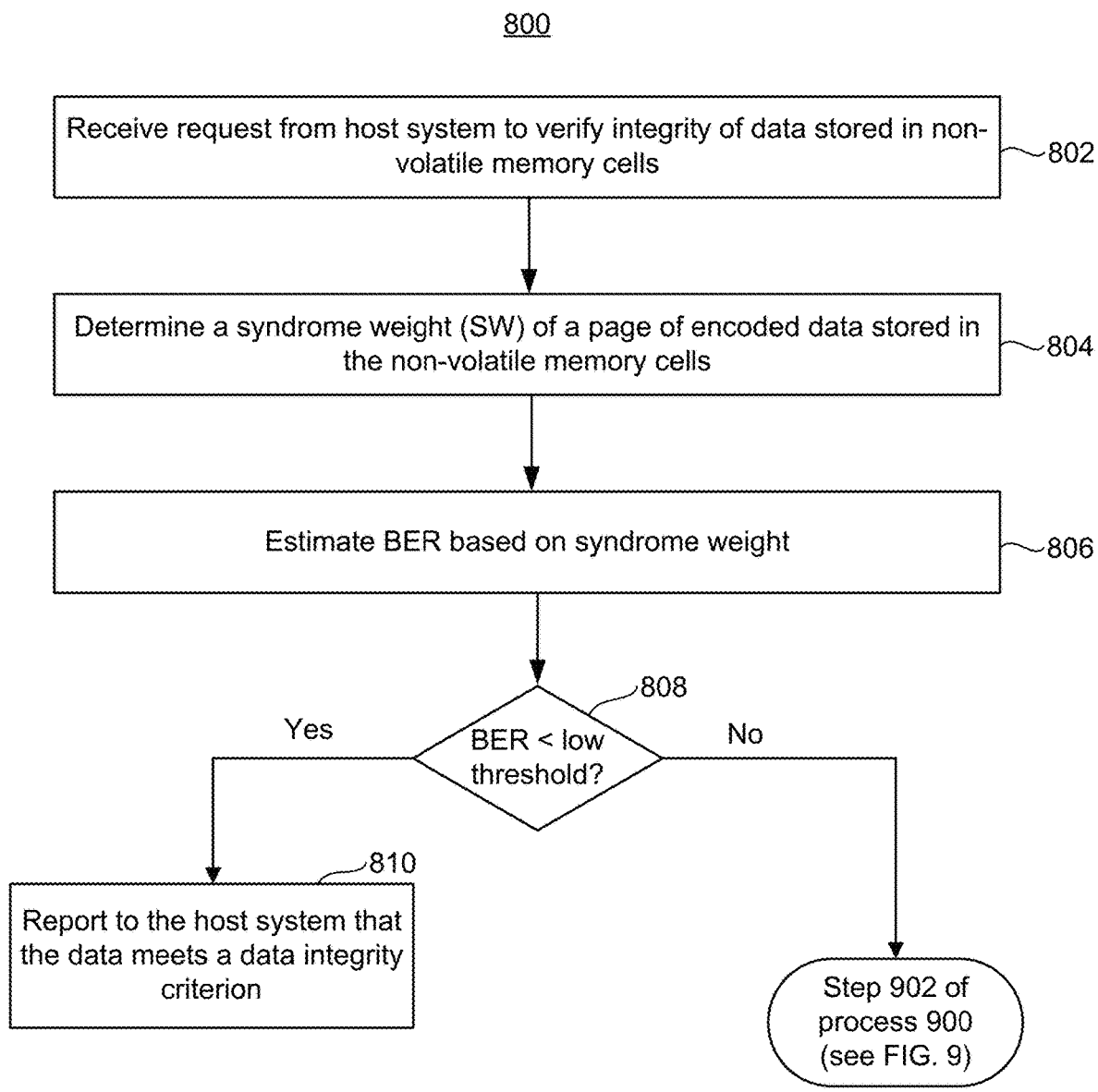
FIG. 8 depicts one embodiment of a process of determining a SW to respond to the verify command.

FIG. 8 depicts one embodiment of a process 800 of determining a SW to respond to the verify command. Process 800 provides further details for one embodiment of process 700. Step 802 includes receiving a request from host system 120 to verify integrity of data stored in non-volatile memory cells.

Step 804 includes determining a SW of a page of encoded data stored in the memory cells. In one embodiment, the page comprises one or more ECC codewords. As noted above, the SW is the number of unsatisfied parity check equations. Step 806 includes estimating the BER, based on the SW. As noted above, the BER may be estimated from the SW, as shown in Equation 1. In one embodiment, a LUT that correlates the SW to BER is used in step 806.

The process 800 takes one of two branches based on the estimated BER, at step 808. If the estimated BER is below a threshold, then at step 810 the storage system 100 reports to the host system 120 that the data meets the data integrity criterion. In one embodiment, the storage system 100 reports to the host system 120 that the data would be have been returned to the host system 120 without an error if the host had requested the data. Hence, in this embodiment, the low threshold in step 808 correlates to no bit errors. In one embodiment, the storage system 100 reports to the host system 120 that the data would be have been returned to the host system 120 either without an error or with a CECC if the host had requested the data. Hence, in this embodiment, the low threshold in step 808 correlates to it being likely that the data is decodable even if there may be a CECC. In other words, the low threshold in step 808 may correlate to it being very unlikely that there will be a UECC.

Figure 9:
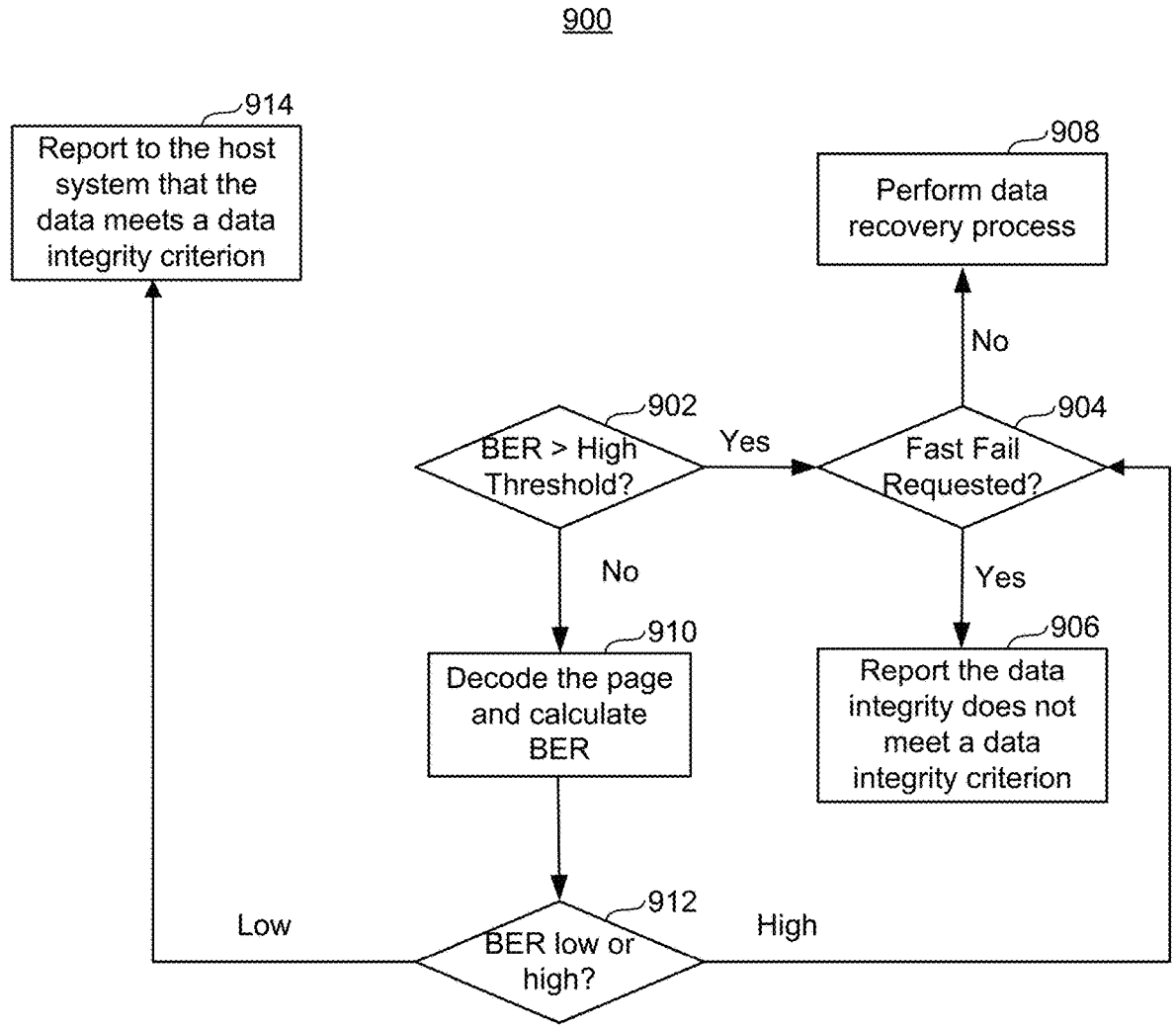
FIG. 9 is a flowchart of one embodiment of a process of responding to a verify command when a SW is used to estimate a BER.

If the estimated BER is above the threshold, then the process continues at step 902 of process 900 (see FIG. 9). FIG. 9 is a flowchart of one embodiment of a process 900 of responding to a verify command when a SW is used to estimate a BER. Process 900 may be performed when the estimated BER is not below the low threshold in step 808 of process 800. Step 902 includes a determination of whether the estimated BER is above a high threshold. In one embodiment, the high threshold is set based on the likelihood that there would be a UECC if the data is decoded. Note that there is some flexibility in setting the high threshold in that the decoding in step 910 (to be discussed below) will catch UECC errors).

If the estimated BER is above the high threshold, step 904 includes a check of whether the host system 120 requested a fast fail. In one embodiment, a fast fail means that the host system 120 specified that the storage system 100 should apply limited retry efforts to obtain the data, which is in contrast to the storage system 100 applying all available error recovery before completing the request to check integrity of the data. If the fast fail is requested, then the storage system reports that the data integrity fails to meet the criterion, in step 906. Therefore, the storage system 100 responds to the verify command without decoding the data, or even going through many iterations of decoding until it is determined that decoding is likely to fail. Hence, both time and power are saved.

If the fast fail is not requested, then the storage system 100 will perform the various levels of available error recovery, in step 908. An example of all available error recovery would be to first attempt to decode the data with one or more ECC decoders having different strengths with respect to the number of bits per codeword that can be corrected. Next, the storage system will re-calibrate read reference levels, followed by more decoding attempts. Next, the storage system will read soft bits and use the soft bits (with hard bits) to attempt to decode the data. Finally, the storage system may use redundancy data such as data in an XOR stripe. The response to the verify command in step 908 may depend on whether there was a CECC, UECC, etc.

Returning again to the discussion of step 902, if the estimated BER is not above the high threshold then step 910 is performed. Note that when combined with step 806 of process 800 this means that the estimated BER is between low threshold and the high threshold. Step 910 includes the storage system decoding the page and determining the BER. In step 912 the storage system 100 determines whether the determined BER is low or high. For example, the storage system 100 determines whether the BER is above or below a threshold. In one embodiment, the threshold in step 912 is the low threshold in step 808. In one embodiment, the threshold in step 912 is set such that a CECC will proceed to step 914 and a UECC will proceed to step 904. If the determined BER is low, then the storage system 100 reports to the host system 120 based on the low BER in step 914. In one embodiment, the report in step 914 is the same as in step 808 of process 800. For example, the memory controller 102 reports to the host system 120 that the integrity of the data meets the criterion. If the determined BER is high, then the process 900 goes to step 904, which has been discussed previously.

Figure 10:
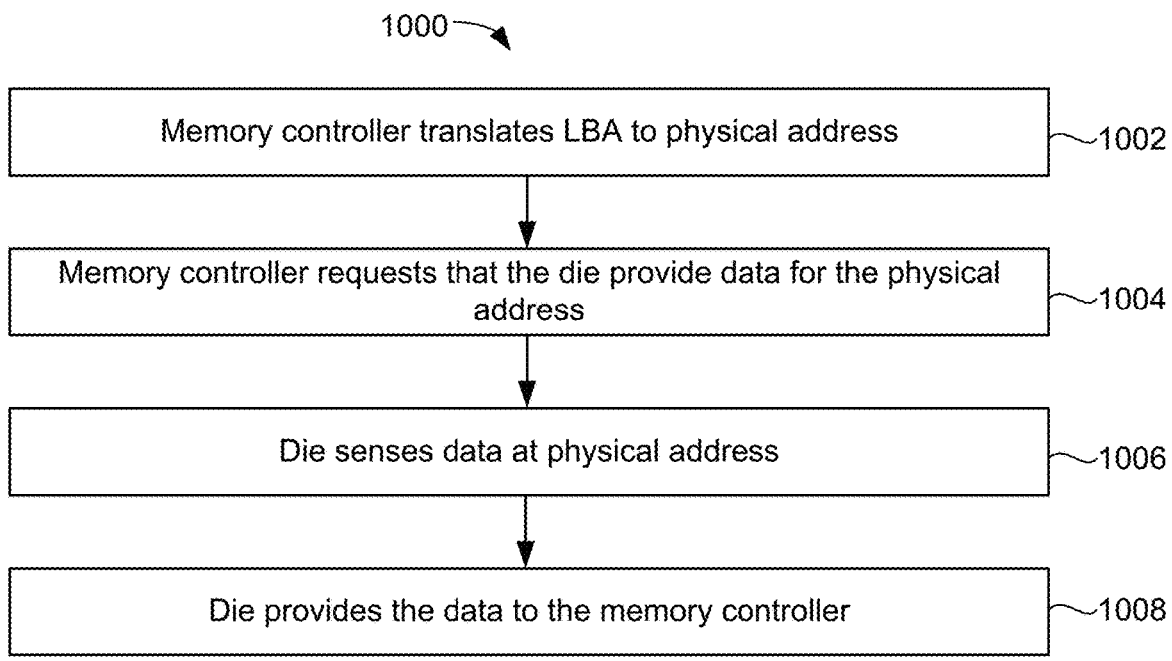
FIG. 10 is a flowchart of one embodiment of a process of the memory controller obtaining the page of data to be verified.

In one embodiment, the memory controller 102 determines the SW (in step 804 of process 800) and decodes the page (if needed in step 910 of process 900). FIG. 10 is a flowchart of one embodiment of a process 1000 of the memory controller 102 obtaining the page of data to be verified. The process 1000 provides further details for an embodiment of process 800 in which the memory controller 102 determines the SW and decodes the data, if necessary. Step 1002 includes the memory controller 102 translating an LBA in the verify command to a physical address in memory structure 326. Step 1004 includes the memory controller 102 requesting that the die (e.g., memory die 300 or control die 304) provide data for the physical address. Step 1006 includes the die sensing data at the physical address. Step 1008 includes the die providing the data to the memory controller 102. After step 1008, the memory controller 102 may perform steps 804-808 of process 800. Then, the memory controller 102 may perform either step 810 or process 900.

Figure 11:
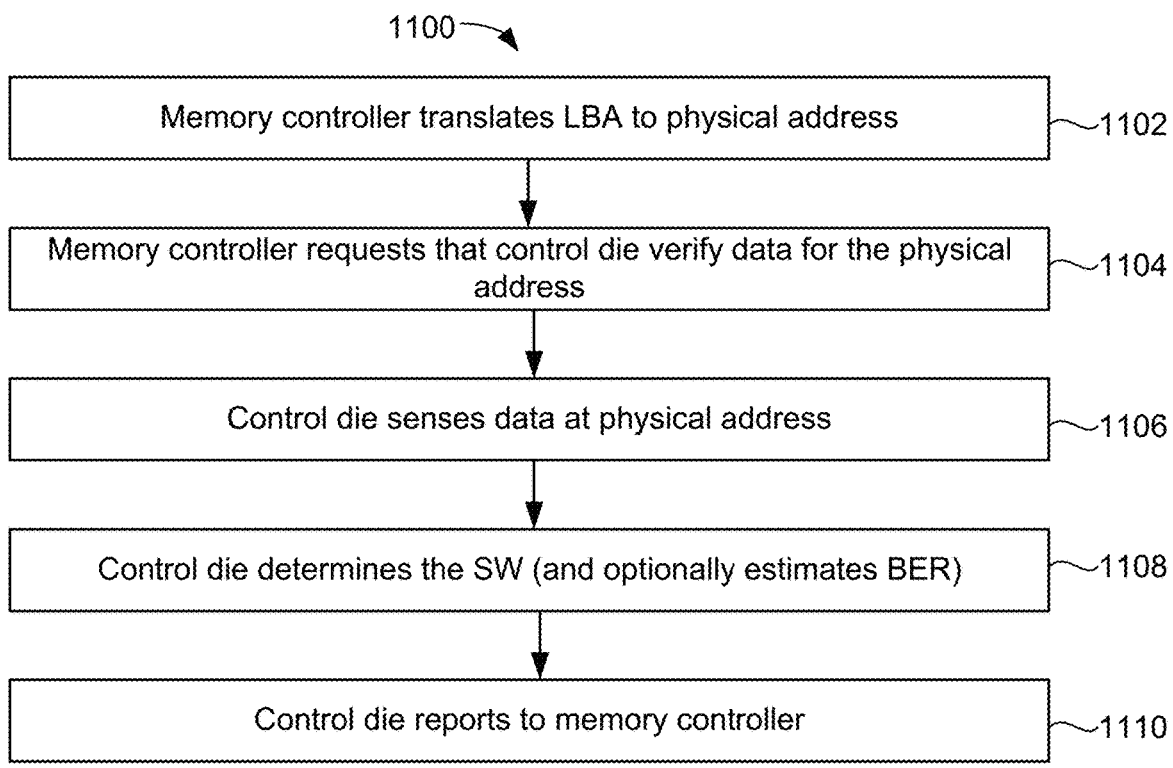
FIG. 11 is a flowchart of one embodiment of a process of calculating a SW for use in responding to a verify command.

In some embodiments, the control die 304 has an ECC engine 330. The ECC engine 330 has a decoder 390, which may be used to decode data stored in the memory structure 326. The ECC engine 330 is also able to calculate a SW of the data. In one embodiment, the control die 304 calculates the SW (in step 804 of process 800). FIG. 11 is a flowchart of one embodiment of a process 1100 of calculating a SW for use in responding to a verify command. The process 1100 provides further details for an embodiment of process 800 in which the SW is calculated by the control die 304. Step 1102 includes the memory controller 102 translating an LBA in a verify command to a physical address in memory structure 326. Step 1104 includes the memory controller 102 requesting that the control die 304 verify the data at the physical address. Step 1106 includes the control die 304 sensing the data at the physical address. Step 1108 includes the control die 304 determining the SW for the data. The control die 304 may also estimate the BER based on the SW. Step 1110 includes the control die 304 reporting to the memory controller 102. The control die 304 could report whether the BER is below the low threshold (see step 808), whether the BER is above the high threshold (see step 902). The control die 304 could simply report the SW. Other options are possible.

After step 1110, the memory controller 102 may perform step 808 and step 810, if the estimated BER is below the low threshold. If the estimated BER between the low threshold and the high threshold, one option is for the control die 304 to transfer the data to the memory controller 102 for the memory controller to decode (e.g., step 910). Another option is for the control die 304 to decode the data using its ECC engine 330. In some embodiments, the control 304 has a low-power decoder that is able to correct a low number of errors per codeword, whereas the memory controller 102 has a high-power decoder that is able to correct a higher number of errors per codeword. Thus, one option is for the control die 304 to attempt to decode the page using the low-power decoder, with the memory controller 102 only using the high-power decoder if the control die 304 is unsuccessful.

Figure 12:
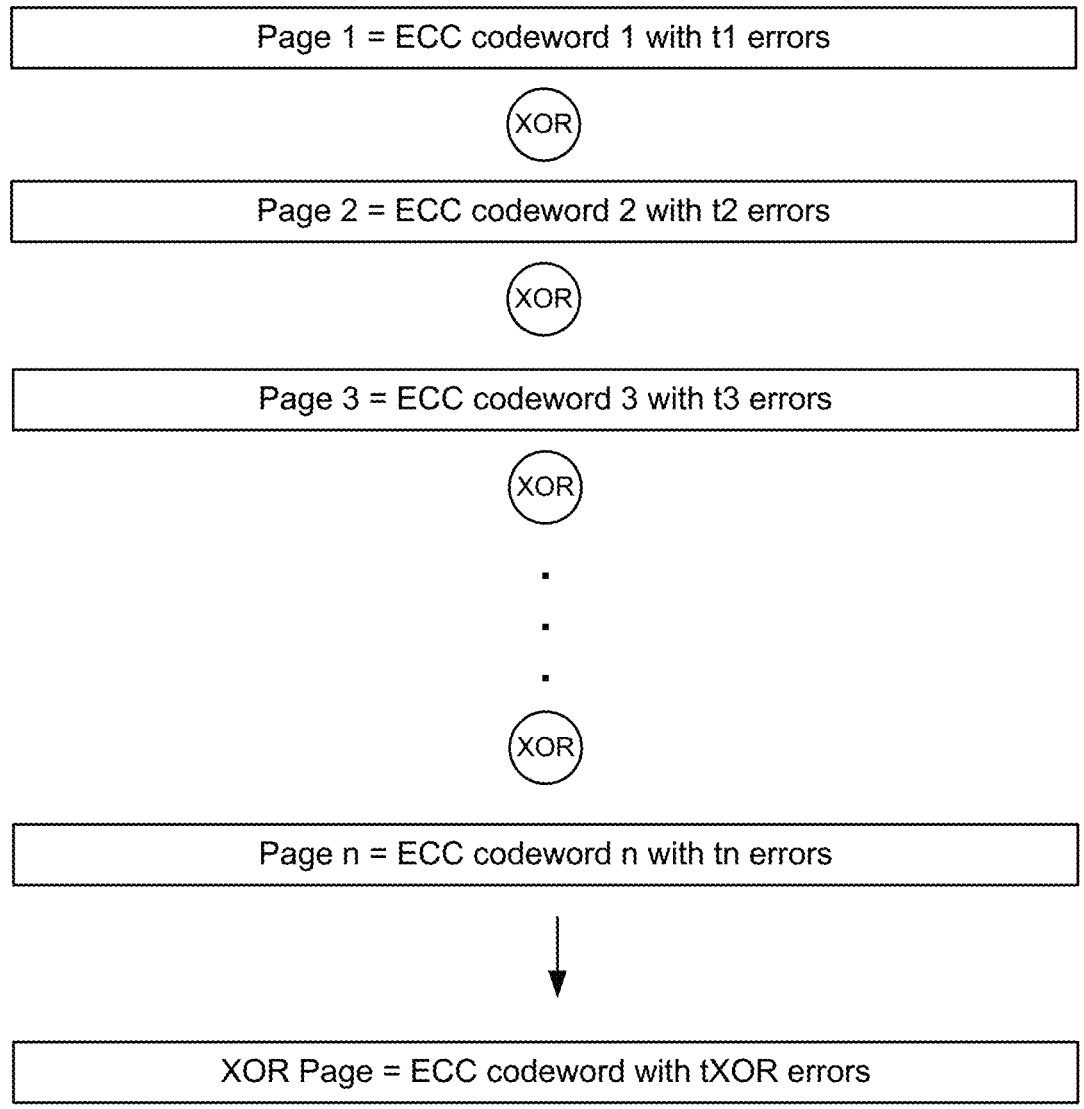
FIG. 12 is a diagram that illustrates how an XOR Page may be formed.

In one embodiment, the storage system 100 forms an XOR codeword from multiple ECC codewords of data to be verified in order to estimate the BER of the data to be verified. FIG. 12 is a diagram that illustrates how an XOR Page may be formed from the XOR of Page 1 to Page n. The XOR operation in FIG. 12 may also be referred to as a sum modulo 2. Each page has an ECC codeword with some number of errors. The XOR page has an XOR codeword having tXOR errors, where assuming a linear ECC code, tXOR is approximately equal to the sum of the errors in Pages 1 to n (see Eq. 2).

$$tXOR \approx t1+t2+t3 \ldots tn \qquad \text{Eq. 2}$$

For a linear ECC (as is the case for LDPC, BCH and other ECC techniques), the XOR of multiple ECC codewords is also a valid ECC codeword. Therefore, the XOR page of the ECC pages is also an ECC codeword. The BER of the XOR codeword may be given by Eq. 3.

$$BER_\oplus = \frac{1 - \prod_{i=1}^{n}(1 - 2 \cdot BER_i)}{2} \cong \sum_{i=1}^{n} BER_i \qquad \text{Eq. 3}$$

In Equation 3, $BER_\oplus$ is the BER of the XOR codeword and $BER_i$ is the BER of the i'th codeword. Thus, in one embodiment, the BER of the XOR codeword is evaluated in order to evaluate the sum of BERs on its constituent codewords. Thus, the BER of the XOR codeword serves as an estimate of the sum the BERs of the codewords in the data to be verified. Hence, a problem in one or more of the codewords to be verified may be identified.

Figure 13:
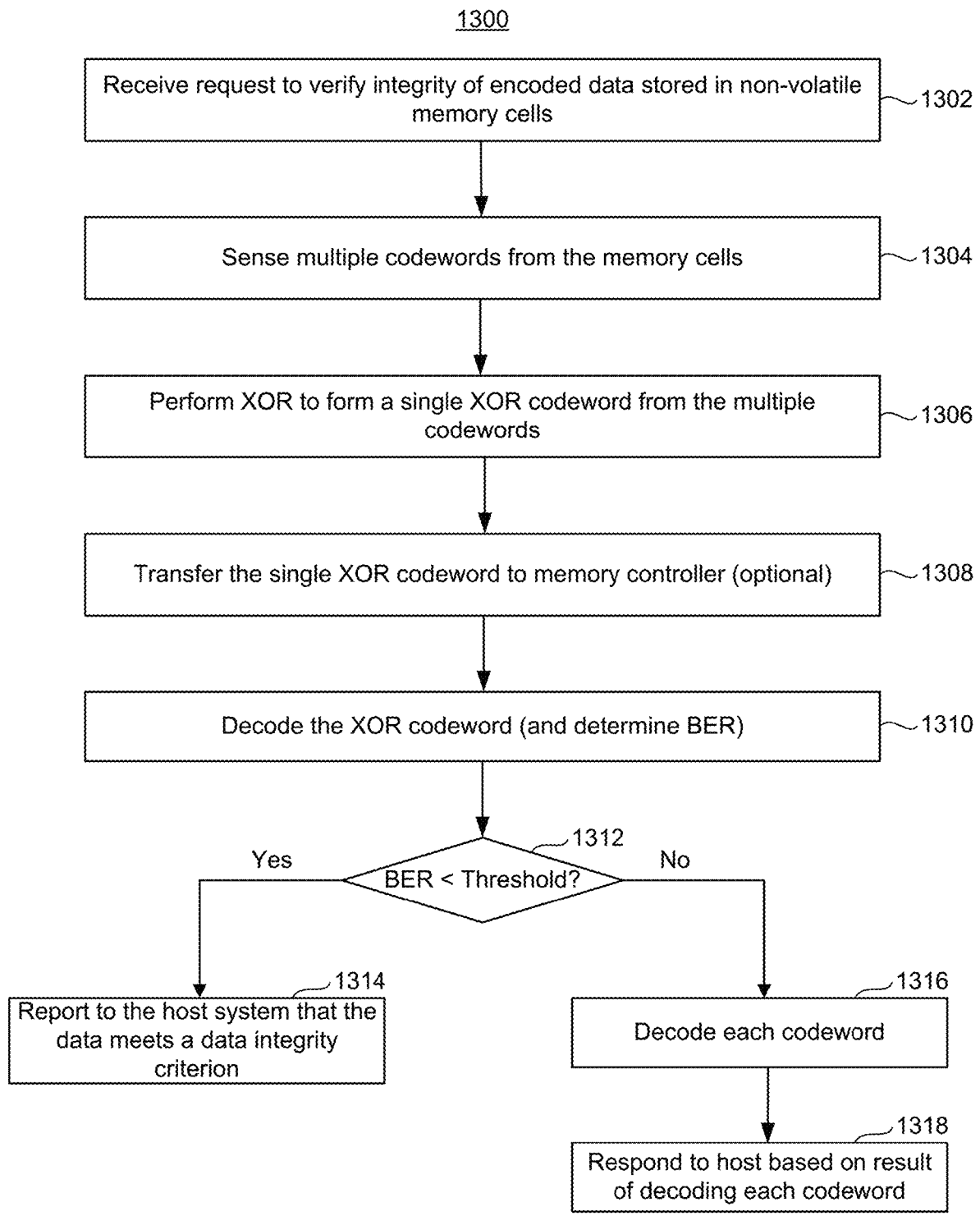
FIG. 13 is a flowchart of one embodiment of a process of verifying integrity of data based on an XOR codeword.

FIG. 13 is a flowchart of one embodiment of a process 1300 of verifying integrity of data based on an XOR codeword. Process 1300 provides further details for one embodiment of process 700. Note that steps of process 1300 are depicted in a certain order as a matter of convenience of explanation. The steps could occur in a different order.

Step 1302 includes receiving a request to verify integrity of encoded data stored in non-volatile memory cells. Step 1304 includes sensing multiple codewords of encoded data from the memory cells. With reference to FIG. 12, a total of n codewords are sensed, where n could be 4, 8, 16, or some other number. The value of n could depend on the expected BER. One factor in the expected BER is whether the memory cells store one bit per cell (SLC) or multiple bits per cell (MLC). For SLC data, the BER is usually quite low. Therefore, n could be higher for SLC data than for MLC data.

Steps 1306 includes performing an XOR to form a single ECC codeword from the multiple ECC codewords. In one embodiment, step 1306 is performed by the memory die 300. In one embodiment, step 1306 is performed by the control die 304. Step 1308 includes transferring the single XOR codeword from the die 300, 304 to the memory controller 102.

Step 1310 includes decoding the XOR codeword. Step 1310 also includes determining a BER of the XOR codeword. The BER of the XOR codeword may be used as an estimate of the total BER of the codewords in the data to be verified. Moreover, the BER of the XOR codeword may be used to identify a potentially high BER with one of the codewords, which can be further investigated.

In step 1312, a determination is made whether the BER is less than a threshold. The threshold may be established such that a potentially high BER with one of the codewords is identified. The following describes one technique for establishing the threshold to use in step 1312. Consider XORing n=16 codewords. Further assume that the expected BER is 0.1% with standard deviation $\sigma$=0.01%. Then, the expected value of $BER_\oplus$ is n*0.1%=1.6% with standard deviation $\sigma_\oplus = \sqrt{\text{square root over }(n \cdot \sigma^2)} = 0.04\%$. Therefore, if the $BER_\oplus$ is higher than 1.6%+3·$\sigma_\oplus$=1.72%, this would serve as an indication that there may be a problem in one of the codewords. In this example, a 3·$\sigma_\oplus$ margin is taken in order to ensure that in normal behavior the probability to cross the threshold is approximately 1/1000.

If the BER is less than the threshold, then in step 1314 the storage system 100 reports to the host system 120 that the integrity of the data meets a data integrity criterion. In one embodiment, the report indicates that the data would have been returned to the host without an error if the host had requested the data. In one embodiment, the report indicates that the data would have been returned to the host either without an error or with a CECC if the host had requested the data. If the BER is not below the threshold, then steps 1316 and 1318 are performed. In step 1316, each codeword is decoded. In one embodiment, each codeword is transferred to the memory controller 102 by either the memory die 300 or control die 304. Step 1318 includes the memory controller 102 reporting to the host system 120 based on the BER of each codeword. In one embodiment, if decoding any of the codewords resulted in an error (e.g., CECC, UECC), then the report is that the data fails to meet the data integrity criterion. In one embodiment, so long as a UECC did not occur, then the report is that the data meets the data integrity criterion. In one embodiment, the report includes the number of CECC and/or UECC that occurred in step 1316. Such a report may inherently indicate whether the data meets the data integrity criterion.

Memory technologies including, but not limited to, NAND may be characterized by Log-Normal error distributions, which means that the BER in most of the storage system is low. Hence, a high BER is observed in only a small number of pages/WLs. Therefore, process 1300 may be used to significantly reduce the amount of transfers and decode attempts. Many storage systems (e.g., large enterprise drives) are typically transfer limited (because there are many dies); therefore, process 1300 can also translate to a significant time reduction.

Figure 14:
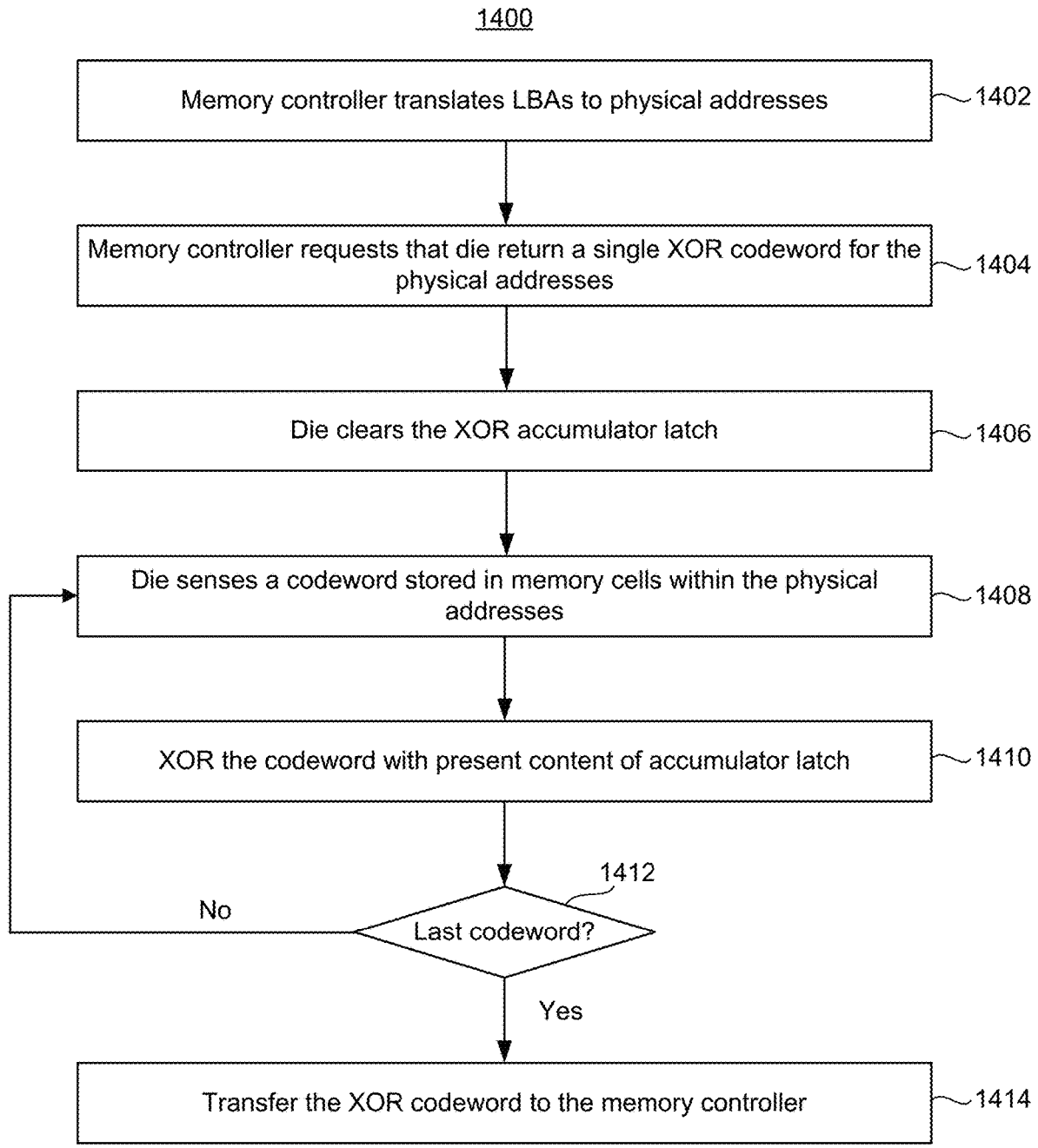
FIG. 14 is a flowchart of one embodiment of a process in which the die forms the XOR codeword for the memory controller to process.

In one embodiment, the die (e.g., memory die 300, control die 304) forms the XOR codeword and transfers the XOR codeword to the memory controller 102 to process. By only transferring the XOR codeword, as opposed to each codeword to be verified, data transfer between the die and memory controller 102 is substantially reduced. FIG. 14 is a flowchart of one embodiment of a process 1400 in which the die forms the XOR codeword for the memory controller 102 to process. Step 1402 includes the memory controller 102 translating LBAs in the verify command to physical addresses of non-volatile memory cells. Step 1404 includes the memory controller 102 requesting that the die return a single XOR codeword for the physical addresses. Step 1406 includes the die clearing the XOR accumulator latches 364. Step 1408 includes the die sensing a codeword that is stored in memory cells having one of the physical addresses. The codeword may be stored in one set of the latches 360. For example, with brief reference to FIG. 3C, the may be latched into latches 360(1) as that codeword is sensed from memory structure 326. Step 1410 includes XORing the sensed codeword with the contents of the XOR accumulator latch 364. For example, the XOR calculator 362 performs a bitwise XOR of the contents of the XOR accumulator latch 364 with the contents of latches 360(1) and stores the result into the XOR accumulator latch 364. Step 1412 is a determination of whether there are more codewords to sense. If so, steps 1408-1410 are performed for the next codeword. When all codewords have been processed, the XOR accumulator latch 364 will contain the XOR codeword. In step 1414, the XOR codeword is transferred to the memory controller 102. The memory controller 102 may then perform step 1310 and subsequent steps in process 1300.

One variation of process 1300 is to estimate the BER of codewords based on the SW instead of decoding codewords to determine the BER. Estimating the BER of codewords based on the BER has been discussed in connection with process 800. In one embodiment, step 1310 is modified by estimating the BER of the XOR codeword based on the SW of the XOR codeword. Hence, the XOR codeword need not be fully decoded. In one embodiment, step 1316 is modified by estimating the BER of each codeword to be verified based on the SW of the respective codeword. Hence, the individual codewords need not be fully decoded in step 1316. Note that estimating the SW may be performed by the memory controller 102 or control die 304.

Figure 15:
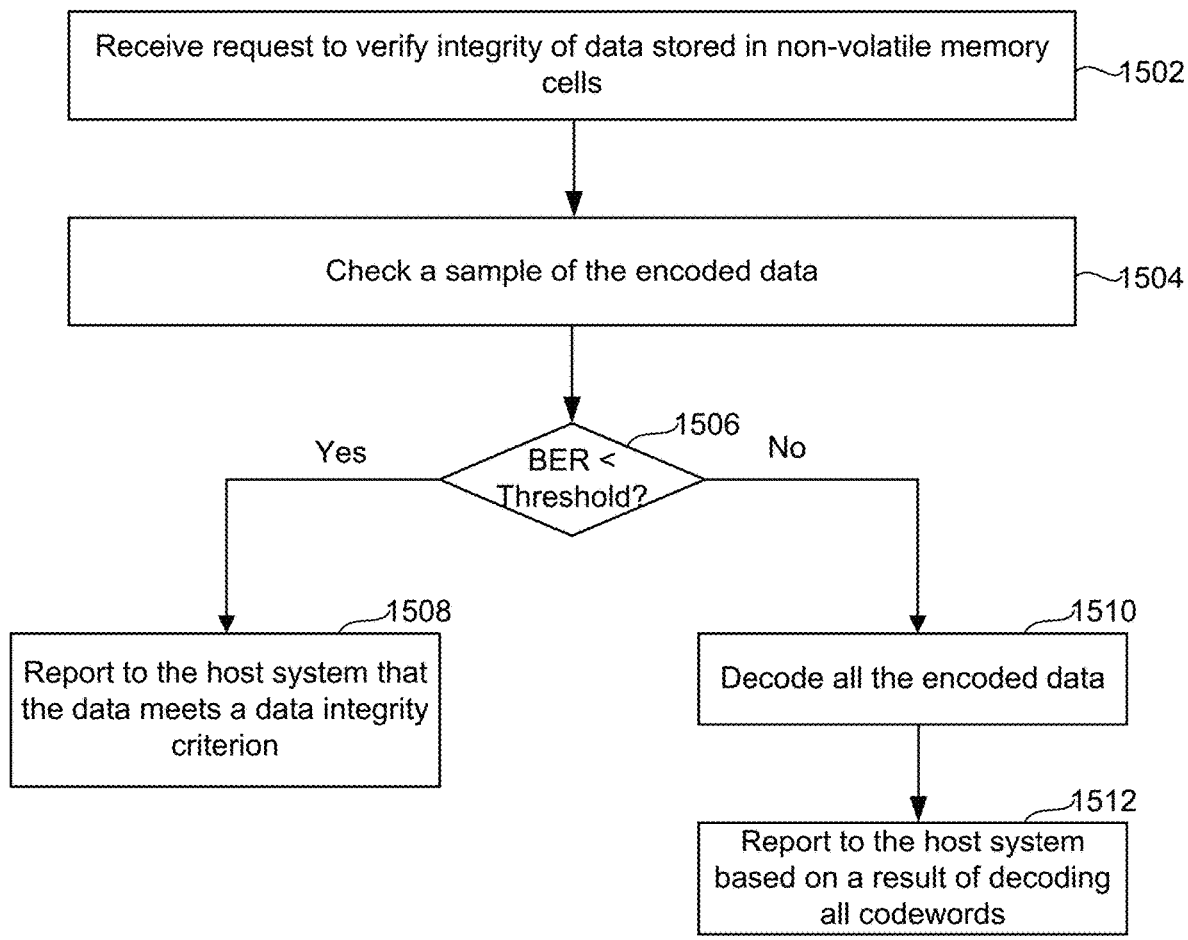
FIG. 15 is a flowchart of one embodiment of a process of verifying integrity of data based on checking a sample of the data.

In one embodiment, the storage system 100 checks only a sample of the data to be verified in order to estimate a BER associated with the data. FIG. 15 is a flowchart of one embodiment of a process 1500 of verifying integrity of data based on checking a sample of the data. Process 1500 provides further details for one embodiment of process 700.

Step 1502 includes the storage system 100 receiving a request to verify integrity of data stored in non-volatile memory cells. Step 1504 includes the storage system 100 checking a sample of the data. In one embodiment, the sample is decoded in order to determine a BER of the sample. The BER of the sample may be used as an estimate of the BER of other data to be verified. In some cases, the sample is taken of memory cells that are expected to have the worst case BER, in which case it would be expected that the other memory cells have a BER that is no worse than the sample. In some cases, the sample is taken of memory cells that are expected to be representative of the other cells, in which case it would be expected that the other memory cells have about the same BER.

In one embodiment, the sample is a subset of word lines. Further details of an embodiment in which the sample is a subset of word lines are described with respect to FIG. 16. In one embodiment, the sample is a subset of pages of the data. Further details of an embodiment in which the sample is a subset of pages are described with respect to FIG. 17. In one embodiment, the sample is one codeword per page of data. Further details of an embodiment in which the sample is one codeword per page of data are described with respect to FIG. 18. The sample in step 1502 is not limited to the foregoing examples.

Step 1506 includes a determination of whether the BER is less than a threshold. If so, then the storage system 100 reports in step 1508 to the host 120 that the data meets a data integrity criterion. In one embodiment, the threshold in step 1506 correlates to it being likely that either there will be no errors in the data or that there any decodable errors will be CECC, if the BER is less than the threshold. In other words, the threshold may be establish such that it is unlikely that there will be any UECC were the data to be decoded.

If the BER is not less than the threshold, then steps 1510-1512 are performed. Step 1510 includes decoding all of the encoded data. Step 1512 includes reporting to the host 120 based on results of decoding all of the data. Step 1512 includes reporting whether the data to be verified meets a data integrity criterion. In one embodiment, the report includes the number of CECC and/or UECC that occurred in step 1510. Such as report may inherently indicate whether the data meets the data integrity criterion.

Figure 16:
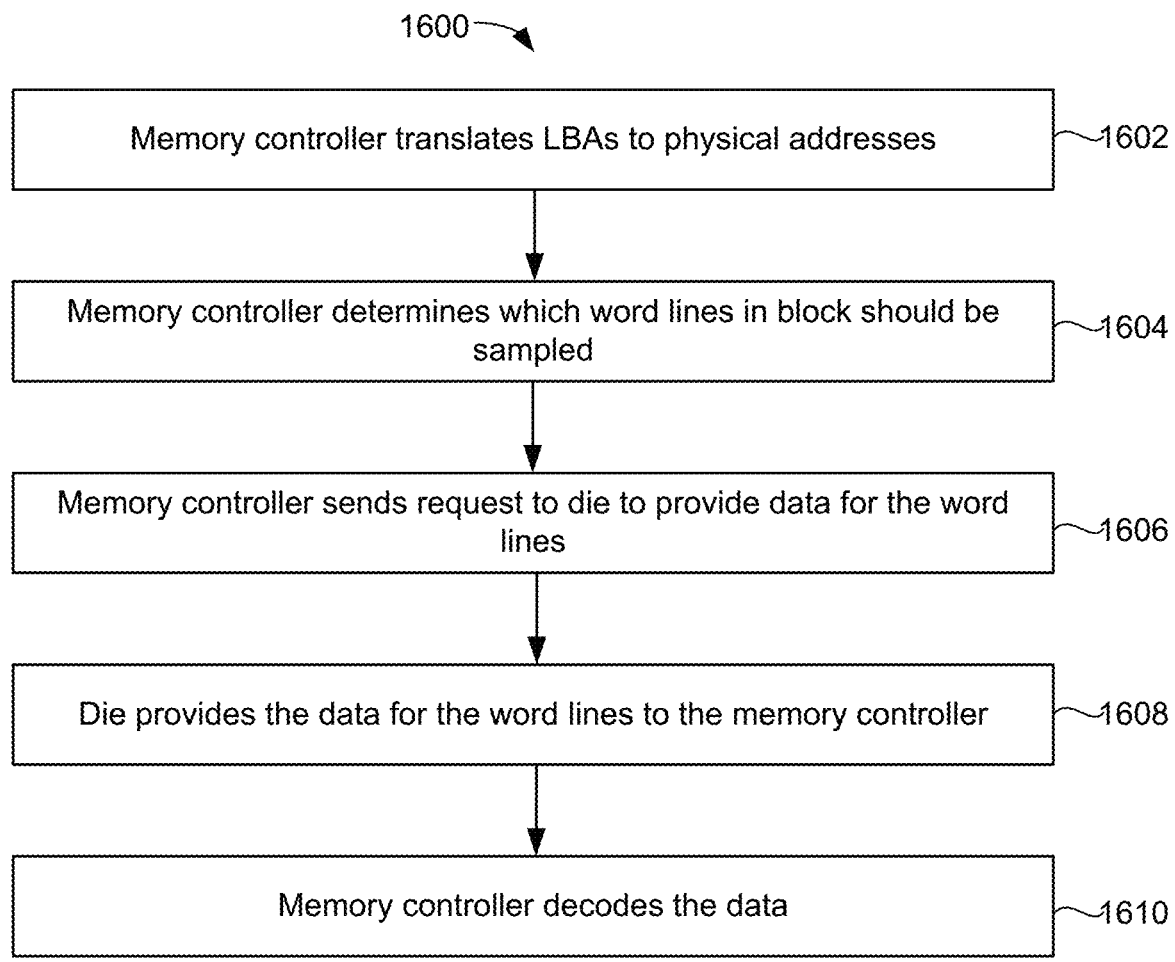
FIG. 16 is a flowchart of one embodiment of a process in which the sample in the process of FIG. 15 is a subset of word lines.

In one embodiment, the sample in step 1504 is a subset of word lines. FIG. 16 is a flowchart of one embodiment of a process 1600 in which the sample is a subset of word lines. Process 1600 provides further details for one embodiment of step 1504. Step 1602 includes the memory controller 102 translating LBAs to physical addresses in the storage system 100. The physical addresses include addresses of multiple word lines in the storage system. Step 1604 includes the memory controller 102 determining which of the word lines should be sampled. As one example, word lines in a certain region of block may be sampled due to an expectation that these word lines are the worst case with respect to BER. Step 1606 includes the memory controller 102 sending a request to the die (e.g., memory die 300, control die 304) to provide data for the word lines. Step 1608 includes the die providing the data for the word lines to the memory controller 102. Step 1610 includes the memory controller 102 decoding the data and determine one or more BERs for the data. The memory controller may then proceed with process 1500 at step 1506. Since there may be one or more BERs for each word line, one option for step 1506 is to use the highest (worst case) BER to compare with the threshold.

Figure 17:
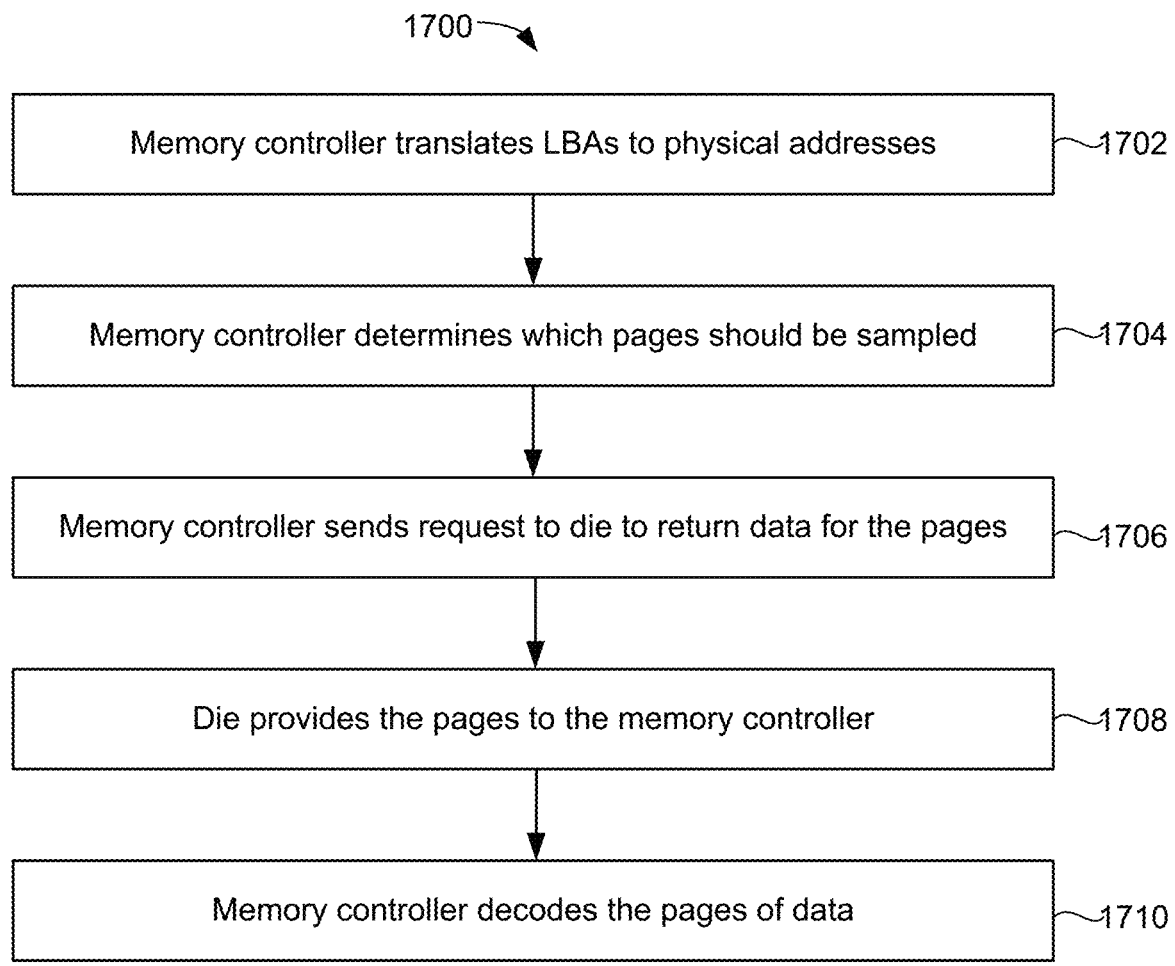
FIG. 17 is a flowchart of one embodiment of a process in which the sample in the process of FIG. 15 is a subset of pages.

In one embodiment, the data to be verified includes a number of pages of data and the sample in step 1504 is a subset of the pages. FIG. 17 is a flowchart of one embodiment of a process 1700 in which the sample is a subset of pages. Process 1700 provides further details for one embodiment of step 1504. Step 1702 includes the memory controller 102 translating LBAs to physical addresses in the storage system 100. The physical addresses include addresses of multiple pages that are stored in memory cells in the storage system.

Step 1704 includes the memory controller 102 determining which of the pages should be sampled. As one example, a group of memory cells that are referred to as a page of memory cells may collectively store multiple pages of data. For example, the page of memory cells could store a lower page, a middle page, and an upper page. More specifically, each memory cell may store one bit of each of these three pages. Hence, each memory cell stores three bits in this example.

Step 1706 includes the memory controller 102 sending a request to the die (e.g., memory die 300, control die 304) to provide data for the pages to be sampled. Step 1708 includes the die providing the data for the pages to the memory controller 102. Note that in the example discussed in step 1704 only one bit is sensed from each memory cell, as opposed to sensing three bits per memory cell which saves time and power. Also, by only transferring a subset of the pages to the memory controller there is a reduction in data transfer.

Step 1710 includes the memory controller 102 decoding the data and determine one or more BERs for the data. The memory controller may then proceed with process 1500 at step 1506. Since there may be one BER for each page, one option for step 1506 is to use the highest (worst case) BER to compare with the threshold.

Figure 18A:
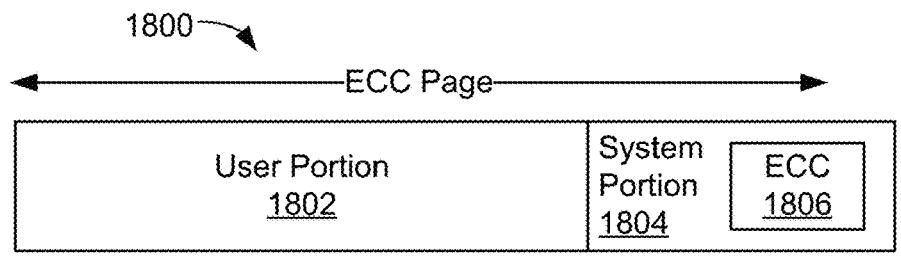
FIG. 18A illustrates schematically an ECC page containing an ECC field.
Figure 18B:
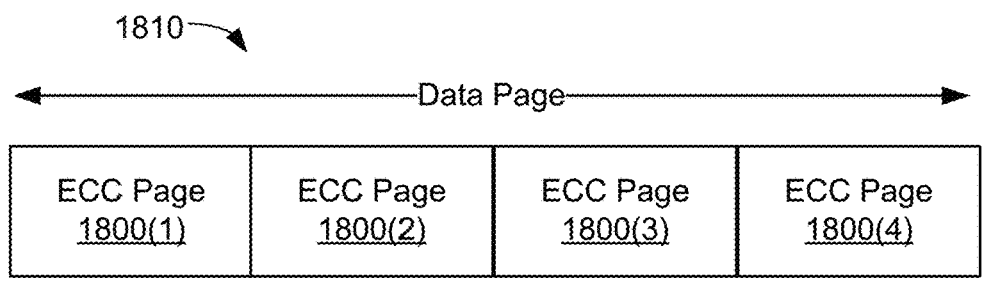
FIG. 18B illustrates a data page that has four ECC pages.

In one embodiment, the data to be verified includes a number of pages of data and the sample in step 1504 is one codeword per page. FIGS. 18A and 18B will be discussed to explain the concept of having multiple codewords per data page. FIG. 18A illustrates schematically an ECC page 1800 containing an ECC field. The ECC page 1800 comprises a user portion 1802 and a system portion 1804. The user portion 1802 is for storage of user data. The system portion 1804 is generally used by the storage system for storage of system data. Included in the system portion is an ECC 1806. The ECC is computed for the ECC page by, for example, memory controller 102.

FIG. 18B illustrates a data page 1810 that has four ECC pages 1800(1)-1800(4). A data page 1810 is the set of data constituted from a logical bit from each memory cell of a page of memory cells on a WL. In general there are N ECC pages making up a data page. In FIG. 18B, N=4 where there are 4 ECC pages making up one data page. Hence, FIG. 18B illustrates how a data page 1810 may contain multiple codewords (in the ECC pages 1800). Typically, the BER of the ECC pages 1800 in the same data page 1810 are quite similar. Hence, by checking only one of the ECC pages per data page 1810 and factoring in some margin, it can be reliably determined that the BER of the other ECC pages is low. In some embodiments, the sample in step 1504 will be one of the ECC pages 1800 in the data page 1810. Hence, time and power is saved by not decoding all of the ECC pages 1800 in the data page 1810.

Figure 19:
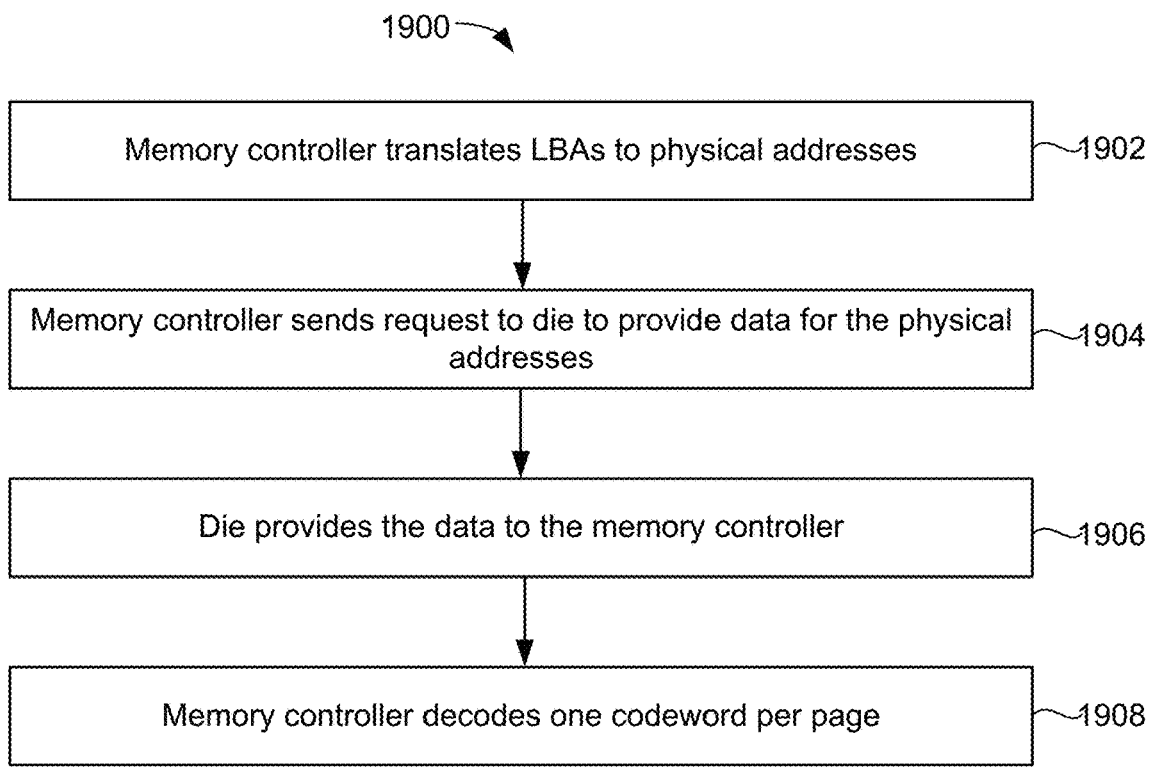
FIG. 19 is a flowchart of one embodiment of a process in which the sample in the process of FIG. 15 is one codeword per page.

FIG. 19 is a flowchart of one embodiment of a process 1900 in which the sample is one codeword per page. Process 1900 provides further details for one embodiment of step 1504. Step 1902 includes the memory controller 102 translating LBAs to physical addresses in the storage system 100.

Step 1904 includes the memory controller 102 sending a request to the die (e.g., memory die 300, control die 304) to provide data for the physical addresses. Step 1906 includes the die providing the data for the physical addresses to the memory controller 102.

Step 1908 includes the memory controller 102 decoding one codeword per page of data. For example, with reference to FIG. 18B, ECC page 1800(1) is decoded for each data page 1810. Thus, time and power is saved by not decoding ECC pages 1800(2), 1800(3) or 1800(4) in any of the data pages 1810. The memory controller may then determine a BER for the ECC page that was decoded for each data page. The memory controller may then proceed with process 1500 at step 1506. Since there may be one BER for each ECC page, one option for step 1506 is to use the highest (worst case) BER to compare with the threshold.

In view of the above, it can be seen that a first embodiment includes an apparatus, comprising a communication interface and a control circuit coupled to the communication interface. The control circuit is configured to connect to non-volatile memory cells. The control circuit is configured to receive a request by way of the communication interface to verify integrity of encoded data stored in the non-volatile memory cells. The control circuit is configured to estimate a BER associated with the encoded data in response to the request without fully decoding the encoded data. The control circuit is configured to report by way of the communication interface that the integrity of the encoded data meets a data integrity criterion responsive to the estimate of the bit error rate being below a first threshold.

In a second embodiment, and in furtherance of the first embodiment, the control circuit is further configured to fully decode the encoded data to determine a bit error rate of the encoded data and report whether the data integrity of the encoded data meets the data integrity criterion based on the determined bit error rate responsive to the estimate of the bit error rate being above the first threshold.

In a third embodiment, and in furtherance of the first or second embodiments, the control circuit is further configured to report that the integrity of the encoded data does not meets the data integrity criterion without fully decoding the encoded data responsive to the estimated bit error rate being above a second threshold that is greater than the first threshold.

In a fourth embodiment, and in furtherance of any of the first to third embodiments, the control circuit is further configured to determine a syndrome weight of the encoded data without fully decoding the encoded data. The control circuit is further configured to estimate the bit error rate associated with the encoded data based on the syndrome weight.

In a fifth embodiment, and in furtherance of any of the first to fourth embodiments, the control circuit is further configured to determine a syndrome weight of the encoded data without fully decoding the encoded data. The control circuit is further configured to estimate the bit error rate associated with the encoded data based on the syndrome weight. The control circuit is further configured to report that the integrity of the encoded data does not meet the data integrity criterion responsive to the estimated bit error rate being above a second threshold that is higher than the first threshold.

In a sixth embodiment, and in furtherance of any of the first to fifth embodiments, the control circuit is further configured to perform a bitwise XOR of multiple codewords of the encoded data to produce an XOR codeword. The control circuit is further configured to determine a bit error rate of the XOR codeword in order to estimate the bit error rate associated with the encoded data without fully decoding the encoded data, wherein the control circuit reports that the integrity of the encoded data meets the data integrity criterion responsive to the bit error rate of the XOR codeword being below the first threshold.

In a seventh embodiment, and in furtherance of any of the first to sixth embodiments, the control circuit is further configured to decode each of the multiple codewords of the encoded data and report whether the integrity of the encoded data meets the data integrity criterion based on a determined bit error rate of each of the multiple codeword responsive to the bit error rate of the XOR codeword being above the first threshold.

In an eighth embodiment, and in furtherance of any of the first to seventh embodiments, the apparatus comprises a semiconductor die and a memory controller. The semiconductor die comprises the control circuit. The control circuit is further configured to perform the bitwise XOR of the multiple codewords of the encoded data to produce the XOR codeword.

In a ninth embodiment, and in furtherance of any of the first to eighth embodiments, the control circuit is further configured to determine a bit error rate of a sample of the encoded data in order to estimate the bit error rate associated with the encoded data without fully decoding the encoded data, wherein the control circuit reports that the integrity of the encoded data meets the data integrity criterion responsive to the bit error rate of the sample of the encoded data being below the first threshold.

In a tenth embodiment, and in furtherance of any of the first to ninth embodiments, the control circuit is further configured to determine a bit error rate in each codeword in the encoded data and report whether the integrity of the encoded data meets the data integrity criterion based on the determined bit error rate of each codeword responsive to the bit error rate of the sample of the encoded data being above the first threshold.

One embodiment includes a method of operating a non-volatile storage system. The method comprises receiving a request at the non-volatile storage system from a host system to verify integrity of data stored in non-volatile memory cells in the storage system. The method comprises determining a syndrome weight of one or more ECC codewords stored in the non-volatile memory cells in response to the request. The method comprises reporting to the host system that the data to be verified meets a data integrity criterion responsive to the syndrome weight of each of the one or more ECC codewords being below a first threshold.

One embodiment includes a non-volatile storage system comprising non-volatile memory cells and sensing means for sensing multiple ECC codewords from the memory cells in response to a request to verify integrity of data stored in the memory cells. The storage system includes XOR means for forming an XOR codeword of the multiple ECC codewords. The storage system includes bit error rate means either for estimating or for determining whether a bit error rate of the XOR codeword is below a first threshold. The storage system includes communication means for reporting that the data to be verified is likely to be decodable responsive to either the estimated bit error rate or the determined bit error rate of the XOR codeword being below the first threshold.

In embodiments, the sensing means comprises one or more of state machine 312, address decoders 314, power control 316, read/write circuits 328, sense blocks 340, and/or latches 360.

In embodiments, the XOR means comprises one or more of XOR calculation 362, data latches 360, XOR accumulator latches 364, and/or memory controller interface 315. In embodiments, the XOR means performs the process depicted in FIG. 12. In embodiments, the XOR means performs steps 1406-1412 of process 1400.

In embodiments, the bit error rate means comprises one or more of ECC 226/256, processor 220/250, state machine 312, syndrome calculation 370, decoder 390, a PGA (Programmable Gate Array, FPGA (Field Programmable Gate Array), ASIC (Application Specific Integrated Circuit), integrated circuit or other type of circuit. In one embodiment, the bit error rate means performs the calculation of Equation 1. In one embodiment, the bit error rate means consults a look-up-table to translate a number of unsatisfied parity-checks W to the estimated BER.

In embodiments, the communication means comprises one or more of PCIe interface to host 150, memory controller interface 315, a PGA (Programmable Gate Array, FPGA (Field Programmable Gate Array), ASIC (Application Specific Integrated Circuit), integrated circuit or other type of circuit.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. An apparatus comprising:
   a communication interface; and
   a control circuit coupled to the communication interface, the control circuit configured to connect to non-volatile memory cells, the control circuit configured to:
      receive a request by way of the communication interface to verify integrity of encoded data stored in the non-volatile memory cells;
      estimate a bit error rate associated with the encoded data in response to the request without fully decoding the encoded data; and
      responsive to the estimate of the bit error rate being below a first threshold, report by way of the communication interface that the integrity of the encoded data meets a data integrity criterion.

2. The apparatus of claim 1, wherein the control circuit is further configured to:
   responsive to the estimated bit error rate being above the first threshold, fully decode the encoded data to determine a bit error rate of the encoded data and report whether the integrity of the encoded data meets the data integrity criterion based on the determined bit error rate.

3. The apparatus of claim 1, wherein the control circuit is further configured to:
   responsive to the estimated bit error rate being above a second threshold that is greater than the first threshold, report that the integrity of the encoded data does not meets the data integrity criterion without fully decoding the encoded data.

4. The apparatus of claim 1, wherein the control circuit is further configured to:
   determine a syndrome weight of the encoded data without fully decoding the encoded data; and
   estimate the bit error rate associated with the encoded data based on the syndrome weight.

5. The apparatus of claim 1, wherein the control circuit is further configured to:
   determine a syndrome weight of the encoded data without fully decoding the encoded data;
   estimate the bit error rate associated with the encoded data based on the syndrome weight; and
   responsive to the estimated bit error rate being above a second threshold that is higher than the first threshold, report that the integrity of the encoded data does not meet the data integrity criterion.

6. The apparatus of claim 1, wherein the control circuit is further configured to:
   perform a bitwise XOR of multiple codewords of the encoded data to produce an XOR codeword; and
   determine a bit error rate of the XOR codeword in order to estimate the bit error rate associated with the encoded data without fully decoding the encoded data, wherein the control circuit reports that the integrity of the encoded data meets the data integrity criterion responsive to the bit error rate of the XOR codeword being below the first threshold.

7. The apparatus of claim 6, wherein the control circuit is further configured to:
   responsive to the bit error rate of the XOR codeword being above the first threshold, decode each of the multiple codewords of the encoded data and report whether the integrity of the encoded data meets the data integrity criterion based on a determined bit error rate of each of the multiple codewords.

8. The apparatus of claim 6, wherein the apparatus comprises a semiconductor die and a memory controller, wherein the semiconductor die comprises the control circuit, wherein the control circuit is further configured to perform the bitwise XOR of the multiple codewords of the encoded data to produce the XOR codeword.

9. The apparatus of claim 1, wherein the control circuit is further configured to:
determine a bit error rate of a sample of the encoded data in order to estimate the bit error rate associated with the encoded data without fully decoding the encoded data, wherein the control circuit reports that the integrity of the encoded data meets the data integrity criterion responsive to the bit error rate of the sample of the encoded data being below the first threshold.

10. The apparatus of claim 9, wherein the control circuit is further configured to:
responsive to the bit error rate of the sample of the encoded data being above the first threshold, determine a bit error rate in each codeword in the encoded data and report whether the integrity of the encoded data meets the data integrity criterion based on the determined bit error rate of each codeword.

11. A method of operating a non-volatile storage system, the method comprising:
receiving a request at the non-volatile storage system from a host system to verify integrity of data stored in non-volatile memory cells in the storage system;
determining a syndrome weight of one or more ECC codewords stored in the non-volatile memory cells in response to the request;
responsive to the syndrome weight of each of the one or more ECC codewords being below a first threshold, reporting to the host system that the data to be verified meets a data integrity criterion; and
performing the following for each respective ECC codeword of the data to be verified having a syndrome weight between the first threshold and a second threshold that is greater than the first threshold:
decoding each respective ECC codeword; and
based on a bit error rate of decoding each respective ECC codeword being below a third threshold that is between the first threshold and the second threshold, reporting to the host system that the data to be verified meets the data integrity criterion.

12. The method of claim 11, further comprising:
responsive to the syndrome weight of any of the one or more ECC codewords being above the second threshold, reporting to the host system that the integrity of the data to be verified does not meet the data integrity criterion if the host system specified that the storage system should apply limited retry efforts to obtain the data.

13. The method of claim 11, further comprising:
responsive to the syndrome weight of any of the one or more ECC codewords being above the second threshold, performing an error recovery process to recover the data to be verified if the host system specified that the storage system should apply all available error recovery before completing the request to verify integrity of the data.

14. A non-volatile storage system comprising:
non-volatile memory cells;
sensing means for sensing multiple ECC codewords from the memory cells in response to a request to verify integrity of data stored in the memory cells;
XOR means for forming an XOR codeword of the multiple ECC codewords;
bit error rate means either for estimating or for determining whether a bit error rate of the XOR codeword is below a first threshold; and
communication means for reporting that the data to be verified is likely to be decodable responsive to either the estimated bit error rate or the determined bit error rate of the XOR codeword being below the first threshold.

15. The non-volatile storage system of claim 14, wherein:
the XOR means resides on a semiconductor die; and
the bit error rate means resides in a memory controller in communication with the semiconductor die by a memory bus, wherein the XOR means is configured to transfer the XOR codeword to the memory controller over the memory bus.

16. The non-volatile storage system of claim 15, wherein the bit error rate means is further configured to perform the following responsive to the estimated bit error rate or the determined bit error rate of the XOR codeword being above the first threshold:
request the semiconductor die to transfer the multiple ECC codewords;
decode the multiple ECC codewords; and
report to a host system whether the data to be verified is likely to be decodable based on a result of decoding each of the ECC codewords.

17. The non-volatile storage system of claim 15, wherein the bit error rate means is further configured to perform the following responsive to the estimated bit error rate or the determined error rate of the XOR codeword being above the first threshold:
request the semiconductor die to transfer the multiple ECC codewords;
estimate a bit error rate of each respective codeword of the multiple ECC codewords based on a syndrome weight of each respective codeword; and
report to a host system whether the data to be verified is likely to be decodable based on the estimated bit error rate of each respective codeword.

18. The non-volatile storage system of claim 14, wherein:
the bit error rate means is configured to decode the XOR codeword to determine the bit error rate of the XOR codeword; and
the communication means is configured to report that the data to be verified is likely to be decodable responsive to the determined bit error rate of the XOR codeword being below the first threshold.

19. The non-volatile storage system of claim 14, wherein:
the bit error rate means is configured to determine a syndrome weight of the XOR codeword to estimate the bit error rate of the XOR codeword; and
the communication means is configured to report that the data to be verified is likely to be decodable responsive to the estimated bit error rate of the XOR codeword being below the first threshold.

* * * * *